US009049207B2

(12) United States Patent
Hugard, IV et al.

(10) Patent No.: US 9,049,207 B2
(45) Date of Patent: *Jun. 2, 2015

(54) ASSET DETECTION SYSTEM

(75) Inventors: James Michael Hugard, IV, Mission Viejo, CA (US); Robin Keir, Glen Allen, VA (US); Joshua Cajetan Rebelo, Bangalore (IN); Ofir Arkin, Petah Tikva (IL); Sven Schrecker, San Marcos, CA (US)

(73) Assignee: McAfee, Inc., Santa Clara, CA (US)

( * ) Notice: Subject to any disclaimer, the term of this patent is extended or adjusted under 35 U.S.C. 154(b) by 373 days.

This patent is subject to a terminal disclaimer.

(21) Appl. No.: 13/444,143

(22) Filed: Apr. 11, 2012

(65) Prior Publication Data
US 2013/0275574 A1 Oct. 17, 2013

(51) Int. Cl.
G06F 15/173 (2006.01)
G06F 15/177 (2006.01)
H04L 29/06 (2006.01)
H04L 12/24 (2006.01)
H04L 29/12 (2006.01)

(52) U.S. Cl.
CPC .............. H04L 63/105 (2013.01); H04L 41/12 (2013.01); H04L 63/00 (2013.01); H04L 63/10 (2013.01); H04L 61/103 (2013.01); H04L 61/2015 (2013.01)

(58) Field of Classification Search
USPC .................................................. 709/220, 224
See application file for complete search history.

(56) References Cited

U.S. PATENT DOCUMENTS

| 5,987,610 | A | 11/1999 | Franczek et al. |
| 6,073,142 | A | 6/2000 | Geiger et al. |
| 6,460,050 | B1 | 10/2002 | Pace et al. |
| 6,574,737 | B1 | 6/2003 | Kingsford et al. |
| 7,003,560 | B1 | 2/2006 | Mullen et al. |
| 7,152,105 | B2 | 12/2006 | McClure et al. |
| 7,299,504 | B1 | 11/2007 | Tiller et al. |
| 7,506,155 | B1 | 3/2009 | Stewart et al. |
| 7,543,056 | B2 | 6/2009 | McClure et al. |
| 2002/0126642 | A1* | 9/2002 | Shitama ........................ 370/338 |
| 2002/0172207 | A1* | 11/2002 | Saito et al. .................... 370/400 |

(Continued)

FOREIGN PATENT DOCUMENTS

KR 20020043994 6/2002
WO WO 2013/155302 A1 10/2013

(Continued)

OTHER PUBLICATIONS

International Search Report and Written Opinion received for the PCT Patent Application No. PCT/US2013/036168, mailed on Jul. 26, 2013, 9 pages.

(Continued)

*Primary Examiner* — Ebrahim Golabbakhsh
(74) *Attorney, Agent, or Firm* — Patent Capital Group

(57) ABSTRACT

A pluggable asset detection engine is used to identify devices within a network. The pluggable asset detection engine includes a set of pluggable discovery sensors and is adapted to identify particular address information of a particular computing device within a network, using a first pluggable discovery sensor in the set of discovery sensors, and send an identification of the particular address information of the particular computing device to an asset management system for inclusion of the particular address information in an asset repository managed by the asset management system.

24 Claims, 15 Drawing Sheets

(56) References Cited

U.S. PATENT DOCUMENTS

| | | |
|---|---|---|
| 2003/0018694 A1 | 1/2003 | Chen et al. |
| 2004/0093408 A1 | 5/2004 | Hirani et al. |
| 2004/0128374 A1 | 7/2004 | Hodges et al. |
| 2004/0139187 A1 | 7/2004 | Park |
| 2004/0193449 A1 | 9/2004 | Wildman et al. |
| 2004/0193918 A1 | 9/2004 | Green et al. |
| 2004/0264465 A1* | 12/2004 | Dunk ............................ 370/392 |
| 2006/0161444 A1 | 7/2006 | Lubrecht et al. |
| 2006/0164296 A1 | 7/2006 | LaMothe et al. |
| 2007/0113287 A1 | 5/2007 | Blumenau et al. |
| 2007/0171842 A1 | 7/2007 | Dow |
| 2007/0180490 A1 | 8/2007 | Renzi et al. |
| 2007/0253431 A1 | 11/2007 | Park et al. |
| 2008/0005784 A1 | 1/2008 | Miliefsky |
| 2008/0008179 A1 | 1/2008 | Chen et al. |
| 2008/0284569 A1 | 11/2008 | Shah |
| 2009/0106844 A1 | 4/2009 | Yoon et al. |
| 2009/0138583 A1 | 5/2009 | Childress et al. |
| 2009/0328033 A1 | 12/2009 | Kohavi et al. |
| 2010/0064362 A1 | 3/2010 | Materna et al. |
| 2010/0131547 A1 | 5/2010 | Magrath et al. |
| 2010/0165947 A1* | 7/2010 | Taniuchi et al. .............. 370/331 |
| 2010/0303006 A1* | 12/2010 | Fernandez Gutierrez .... 370/328 |
| 2011/0055374 A1* | 3/2011 | Christenson et al. ......... 709/224 |
| 2012/0030241 A1 | 2/2012 | Lupoli et al. |
| 2012/0233330 A1* | 9/2012 | Arwe et al. ................... 709/226 |
| 2013/0111065 A1* | 5/2013 | Donley et al. ................. 709/245 |
| 2013/0275575 A1 | 10/2013 | Hugard, IV et al. |
| 2013/0276053 A1 | 10/2013 | Hugard, IV et al. |

FOREIGN PATENT DOCUMENTS

| | | |
|---|---|---|
| WO | WO 2013/155344 A1 | 10/2013 |
| WO | WO 2013/155357 A1 | 10/2013 |

OTHER PUBLICATIONS

International Search Report and Written Opinion received for the PCT Patent Application No. PCT/US2013/036257, mailed Jul. 25, 2013, 4 pages.

International Search Report and Written Opinion mailed Jul. 25, 2013 from International Application No. PCT/US2013/036239, 8 pages.

Sung, Jongwoo, et al., "The EPC Sensor Network for RFID and WSN Integration Infrastructure," Mar. 23, 2007, IEEE, pp. 618-621, 4 pages.

U.S. Appl. No. 13/444,281, filed Apr. 11, 2012, entitled, "System Asset Repository Management," Inventor(s) James Michael Hugard IV, et al.

U.S. Appl. No. 13/444,459, filed Apr. 11, 2012, entitled, "Network Address Repository Management," Inventor(s) James Michael Hugard IV, et al.

* cited by examiner

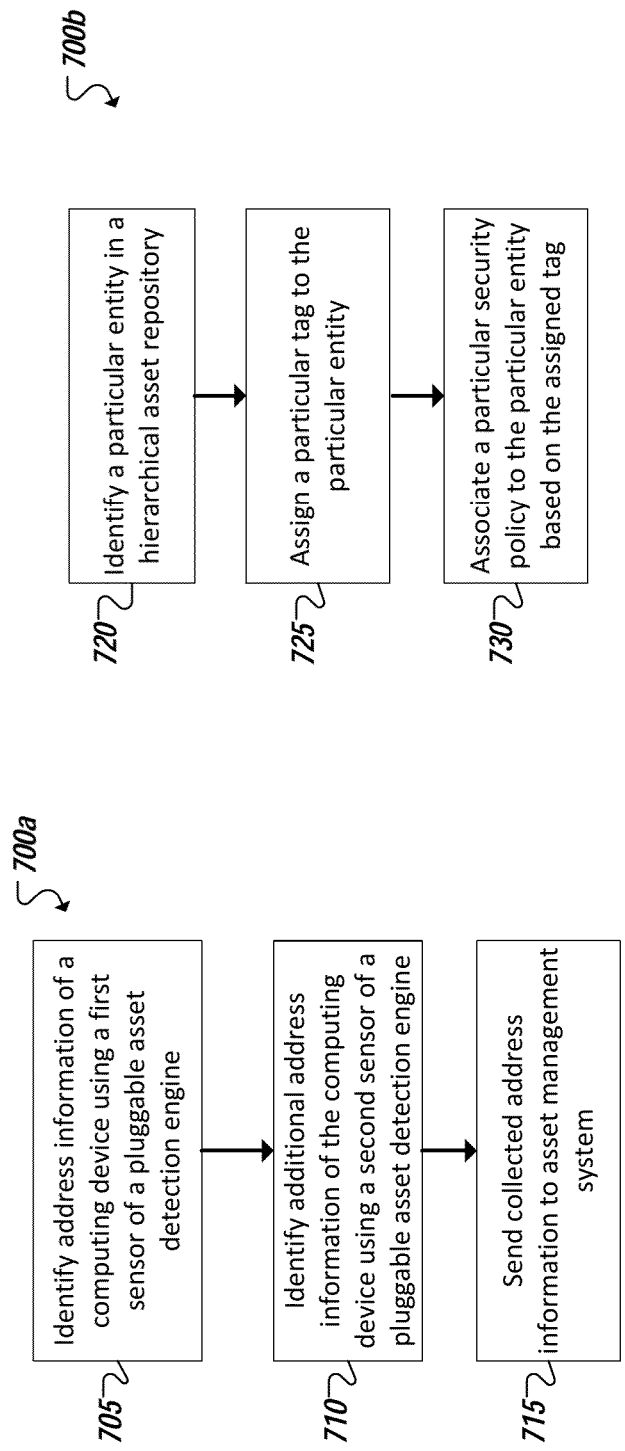

ASSET DETECTION SYSTEM

TECHNICAL FIELD

This disclosure relates in general to the field of computing security and, more particularly, to network discovery and security.

BACKGROUND

Security management within modern networks can include assigning and enforcing security policies against devices in the network. Enforcing security policies can include or be preceded by the identification of devices on the network. Address sweeping and ping sweeping have been used to discover network devices. Such techniques include human users manually configuring one or more ranges of network addresses, such as internet protocol ("IP") addresses, and then asking the software to "sweep" or "probe" every address in the specified ranges in an effort to find live devices. Such a sweep can produce results indicating whether a particular address is in use, implying the presence of a network device at that address. In networks employing internet protocol version 4 ("IPv4") addressing, such brute force scanning can be used to scan each address in a broad range of addresses (including all possible IPv4 addresses) in a reasonable amount of time.

BRIEF DESCRIPTION OF THE DRAWINGS

FIGS. 7A-7C are simplified flowcharts illustrating example techniques for managing assets within one or more networks in accordance with at least one embodiment.

Like reference numbers and designations in the various drawings indicate like elements.

DETAILED DESCRIPTION OF EXAMPLE EMBODIMENTS

Overview

Figure 1:
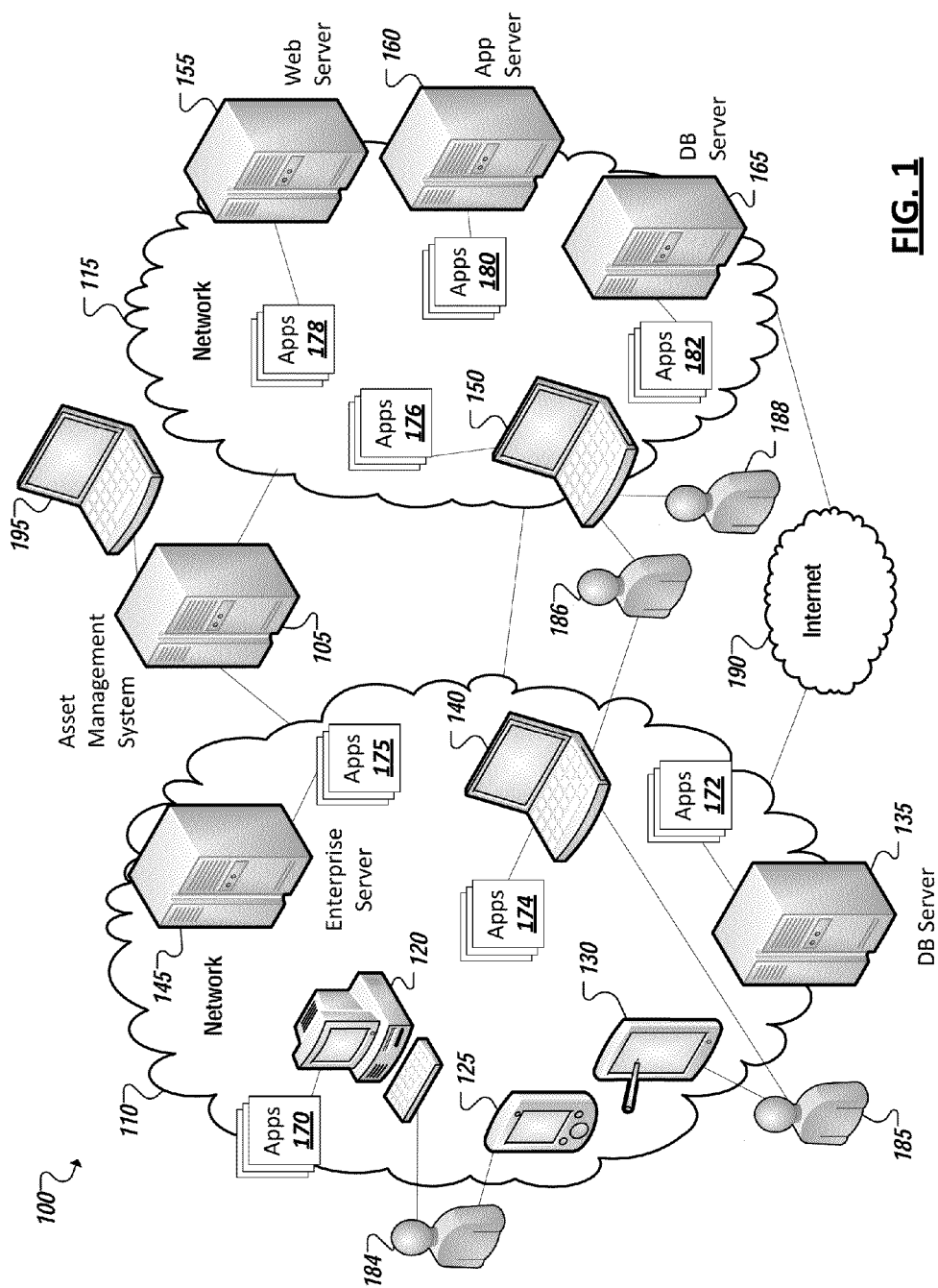
FIG. 1 is a simplified schematic diagram of an example computing system including a plurality of assets and system entities in accordance with at least one embodiment.

In general, one aspect of the subject matter described in this specification can be embodied in methods that include the actions of identifying, using an asset detection engine, address information of a particular computing device within a network and sending an identification of the address information to an asset management system for inclusion of the address information in an asset repository managed by the asset management system. Identification of the address information can be facilitated by a first pluggable discovery sensor in a set of discovery sensors included in the asset detection engine.

In another general aspect of the subject matter described in this specification can be embodied in systems that include at least one processor device, at least one memory element, and a pluggable asset detection engine. The pluggable asset detection engine can include a set of pluggable discovery sensors and be adapted, when executed by the at least one processor device, to identify particular address information of a particular computing device within a network, using a first pluggable discovery sensor in the set of discovery sensors, and send an identification of the particular address information of the particular computing device to an asset management system for inclusion of the particular address information in an asset repository managed by the asset management system.

These and other embodiments can each optionally include one or more of the following features. Additional attributes of the particular computing device can be identified using a second pluggable discovery sensor in the set of discovery sensors. A security policy can be assigned to the particular computing device based on the identified attributes identified using pluggable discovery sensors in the set of discovery sensors. The additional attributes can include active ports of the particular computing device, operating systems of the particular computing device, applications of the particular computing device, and as well as other attributes. The particular computing device can be tagged to associate the particular computing device with a particular grouping of computing devices and the security policy ican be associated with the particular grouping of computing devices. Each discovery sensor in the set of discovery sensors can be a pluggable discovery sensor. The asset management system can determine that the identified address information is not included in the asset repository, and identification of the address information can be in connection with the discovery of the particular computing device within the network. A pluggable discovery sensor can be added to the set of discovery sensors. One pluggable discovery sensor in the set of discovery sensors can be replaced with another pluggable discovery sensor.

Further, these and other embodiments can also each optionally include one or more of the following features. Event-based pluggable discovery sensors can be included in the set of discovery sensors and be adapted to identify address information of computing devices on the network from event record data describing events in the network identified by event management services on the network. Event-based pluggable discovery sensors can be adapted to access event record data of dynamic host configuration protocol (DHCP) server events, Active Directory audit events, firewall events, intrusion prevention system (IPS) events, and other event management services. Latent-type pluggable discovery sensors can be included in the set of discovery sensors and be adapted to identify address information of computing devices on the network from network traffic monitored by the passive-type pluggable discovery sensor. Latent-type pluggable discovery sensors can be adapted to monitor NetBIOS broadcast packets in the network traffic, internet control message protocol version 6 (ICMPv6) network traffic, network traffic via port mirroring, among other examples. Indirect-type pluggable discovery sensors can be included in the set of discovery sensors and be adapted to query services of the network for data including address information of computing devices within the network. Indirect-type pluggable discovery sensors can be adapted to query a simple network management protocol (SNMP) management information base (MIB), query a DHCP database, query a router table, issue a netstat command on another computing device in the network, among other examples. Active-type pluggable discovery sensors can be included in the set of discovery sensors and be adapted to send data to the particular computing device, such as a set of Internet control message protocol (ICMP) packets, a set of transmission control protocol (TCP) packets, and a set of user datagram protocol (UDP) packets, and be further adapted to monitor responses to the sent data. The set of discovery sensors can include the active-type pluggable discovery sensor and at least one passive-type pluggable discovery sensor, such as a latent-type discovery sensor, event-based discovery sensor, or indirect-type discovery sensor. The asset management system can be adapted, when executed by at least one processor device to, receive the particular address information from the asset detection engine, determine whether the address information is associated with devices described in the asset repository, and supplement the asset repository with address information not included in the asset repository. The asset detection engine can be a first asset detection engine in a plurality of asset detection engines in the system. The plurality of asset detection engines can include a second asset detection engine, where the set of discovery sensors of the first asset detection engine is a first set and the second asset detection engine includes a second set of discovery sensors, the first set of discovery sensors different from the second set of discovery sensors. The first set of discovery sensors can include a particular discovery sensor also included in the second set of discovery sensors.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

FIG. 1 is a simplified block diagram 100 illustrating an example implementation of a computing environment including a plurality of system entities, including networks (e.g., 110, 115), system devices (i.e., computing devices (e.g., 120, 125, 130, 135, 140, 145, 150, 155, 160, 165) within the networks, including endpoint devices, network elements such as routers, switches, firewalls, and other devices communicating over or facilitating the networks (e.g., 110, 115)), applications and other software programs and services (e.g., 170, 172, 174, 175, 176, 178, 180, 182) served, hosted, installed, loaded, or otherwise used by the various systems in on networks, as well as human persons (e.g., 184, 185, 186, 188) known to use the computing environment and its constituent systems and applications.

In practice, endpoints devices, network elements, and other computing devices (or "system-type system entities") included in a network can communicate with and/or facilitate communication between other devices on the network. For instance, endpoint devices (e.g., 120, 125, 130, 140, 150) can provide persons (e.g., 184, 185, 186, 188) using the computing environment with interfaces for interacting with and consuming various resources hosted by computing devices on the network (e.g., 110) as well as other networks (e.g., 115) within a system, the Internet 190, and other networks. Further, some endpoint devices (e.g., 120, 140, 150) can additionally host applications and other software resources (e.g., 170, 174, 176) that can be consumed by users (e.g., 184, 185, 186, 188) locally at the respective endpoints as well as served to other devices on the network(s) (e.g., 110, 115). Other devices (e.g., 135, 145, 155, 160, 165) on networks 110, 115 can additionally serve software resources (i.e., applications (e.g., 172, 175, 178, 180, 182)) to one or more clients (including other servers) for consumption. Such software resources can include, as examples, databases, webpages, web applications, software applications and other programs, virtual machines, enterprise resource planning, document management systems, mail servers, and other software resources.

"System entities," also referred to as "assets," within a particular computing environment can be defined, within one or more security contexts, to include "network-type entities," "system-type entities," "application-type entities," and "person-type entities" within (or participating in) the computing environment. "Person-type entities," representing individual persons using the computing environment, in this example, can be considered a system entity together with network-type entities, system-type entities, and application-type entities can be different from users identified within a computing environment. Persons can be associated with or defined by one or more user accounts or particular user identifiers within a system. However, users do not always map accurately to the actual persons using the computing environment. For instance, a single person can have (or have access to) multiple usernames or user accounts within a system. Additionally, some persons may not have a registered username or user account. When tailoring security contexts to a particular person's use tendencies and attributes, however, the person's actual identity can be more germane than a user profile, username, or alias used by the person within the computing environment.

An asset management system 105 can be provided, in some examples, capable of discovering and maintaining records of the various system entities within a computing environment, as well as assigning security policies to the various system entities and causing the security policies to be enforced throughout the computing environment. Attributes of the discovered system entities can also be discovered, including identifiers for the system entities. For instance, IP addresses and IP address ranges can be discovered for various systems and networks within the computing environment. Further, with the advent and deployment of internet protocol version 6 ("IPv6") addressing in modern networks, the size of IP addresses is designed to increase from 32-bits (in IPv4) to 128-bits under IPv6. As a consequence, while IPv4 provided for a manageable address space of $2^{32}$ (4,294,967,296) possible addresses, IPv6's 128-bit addresses allow for an address space of $2^{128}$ (approximately 340 undecillion or $3.4 \times 10^{38}$) addresses. To put in context the size of the IPv6 address space, if brute force scanning of each address within the IPv6 address space for "live" addresses could be achieved at a rate of a single picosecond per address, it would still take 10.78× $10^{19}$ years to scan the entire IPv6 space. Employing IPv6 addressing can, therefore, significantly complicate efforts to map devices within a network and monitor security and other activities of the network's respective devices. Accordingly, asset management system 105 can employ techniques to more efficiently identify active IPv6 addresses allowing for more targeted analyses of networks employing IPv6. Further, in addition to being able to discover IPv6 addresses and other address information of devices and network elements within the computing environment, asset management system 105 can further manage discovery techniques allowing for the discovery of additional attribute information, such as the operating system of the devices, ports used by the devices, protocols employed by the devices, and so on. From the device-level, additional information can be discovered, including other system entities stemming, hierarchically, from the system-level, such as individual applications hosted by the device and individual persons using the device.

Implementations of asset management system 105 can utilize attributes of the various system entities to group the entities into one or more logical groupings of system entities. Further, asset management system 105 can identify and assign various security policies to the groupings. Such logical groupings can group different system entities together according to attributes or designations shared by the system entities within a particular computing environment. Security policies assigned to the groupings can correspond to or address the shared attributes and characteristics of the system entities included in a grouping. For instance, a grouping of systems can be tagged within a repository of systems as "critical systems." Accordingly, those systems identified as critical can have a common set of security policies applied to them (e.g., by virtue of their criticality within the computing environment). In another examples, a grouping of networks can be identified according to a particular type of network, such as a grouping of DMZ networks, according to associated addresses (e.g., based on IP-address ranges, internal and external IP-addresses, domain names, etc.), or according to an associated geographical region, among other examples, and such groupings can be correspondingly tagged. Applications can also be tagged and grouped according to type, criticality, software provider, operating system, etc. For instance, tags can be assigned to application-type entities to indicate that an application is database or type of database (e.g., production database, staging database, etc.), web application, middle ware, web server, among many other examples. Further, person-type entities can also be tagged, for instance, to identify such personal attributes of the person as their role in an organization, security clearance, permissions, office, geographical location, business unit, etc. Additionally, in some examples, system entities can be strongly typed (e.g., "network," "system," "application," and "person"), and particular groups of system entities can be limited to a particular type of system entity. In such examples, security policies applied to the grouping can also be type-specific. In other examples, groupings and tags can be "cross-typed," and associated security policies can also be cross-typed. For instance, a particular grouping can include one or more systems and one or more applications and/or one or more persons, etc.

In general, "servers," "clients," "computing devices," "network elements," "hosts," "system-type system entities," and "systems," including computing devices in example computing environment 100 (e.g., 105, 120, 125, 130, 135, 140, 145, 150, 155, 160, 165, 195, etc.), can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of devices, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 120, 125, 130, 135, 140, 145, 150, 155, 160, 165, 195, etc.) can each include one or more processors, computer-readable memory, and one or more interfaces, among other features and hardware. Servers can include any suitable software component or module, or computing device(s) capable of hosting and/or serving software applications and services (e.g., the asset management system 105, services and applications (e.g., 172, 175, 178, 180, 182) of servers (e.g., 135, 145, 155, 160, 165), including distributed, enterprise, or cloud-based software applications, data, and services. For instance, servers can be configured to host, serve, or otherwise manage models and data structures, data sets, software service and applications interfacing, coordinating with, or dependent on or used by other services and devices. In some instances, a server, system, subsystem, or computing device can be implemented as some combination of devices that can be hosted on a common computing system, server, server pool, or cloud computing environment and share computing resources, including shared memory, processors, and interfaces.

User, endpoint, or client computing devices (e.g., 120, 125, 140, 150, 195) can include traditional and mobile computing devices, including personal computers, laptop computers, tablet computers, smartphones, personal digital assistants, feature phones, handheld video game consoles, desktop computers, internet-enabled televisions, and other devices designed to interface with human users and capable of communicating with other devices over one or more networks (e.g., 110, 115). Attributes of user computing devices, and computing device generally (e.g., 105, 120, 125, 130, 135, 140, 145, 150, 155, 160, 165, 195, etc.), can vary widely from device to device, including the respective operating systems and collections of software programs loaded, installed, executed, operated, or otherwise accessible to each device. For instance, computing devices can run, execute, have installed, or otherwise include various sets of programs, including various combinations of operating systems, applications, plug-ins, applets, virtual machines, machine images, drivers, executable files, and other software-based programs capable of being run, executed, or otherwise used by the respective devices.

Some computing devices (e.g., 120, 125, 140, 150, 195) can further include at least one graphical display device and user interfaces allowing a user to view and interact with graphical user interfaces of applications and other programs provided in system 100, including user interfaces and graphical representations of programs interacting with applications hosted within the computing devices as well as graphical user interfaces associated with an asset management system 105. Moreover, while user computing devices (e.g., 120, 125, 140, 150, 195) may be described in terms of being used by one user, this disclosure contemplates that many users may use one computer or that one user may use multiple computers.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
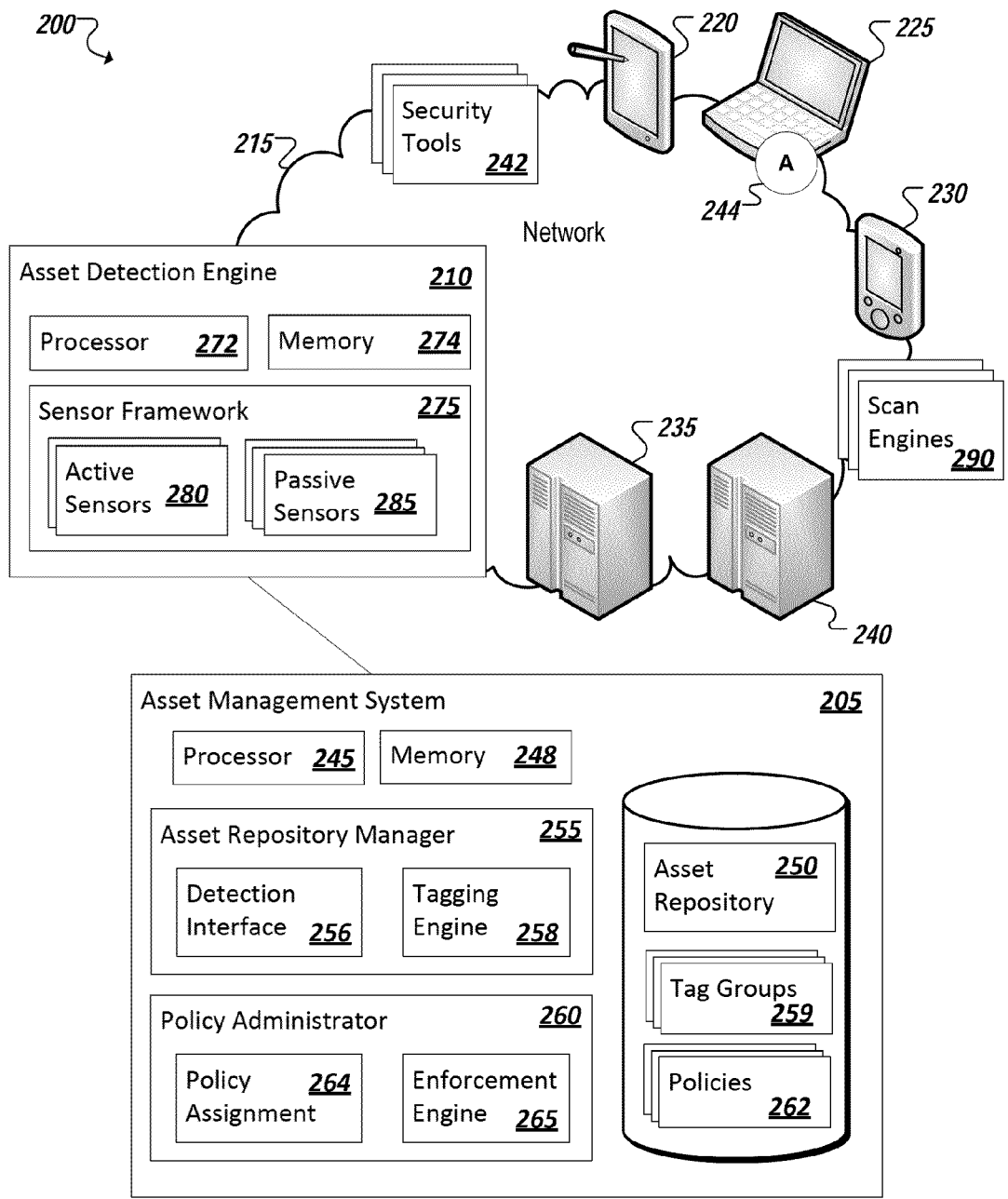
FIG. 2 is a simplified block diagram of an example computing system including asset management system and one or more asset detection engines operating in connection with one or more networks in accordance with at least one embodiment.

FIG. 2 is a simplified block diagram 200 illustrating an example system including an example asset management system 205 operating cooperatively with one or more asset detection engines (e.g., 210) deployed in one or more networks (e.g., 215) and tasked with discovering computing devices (e.g., typed as "system-type system entities") (e.g., 220, 225, 230, 235, 240) within the network 215, together with addresses and attributes of the discovered devices. This information can then, in turn, be used by the asset management system 205 to discover further attributes of the computing devices as well as discover other types of system entities of a computing environment such as persons using the computing environment and applications served using devices in the computing environment. Further, using this information, an asset management system 205 can group identified system entities and use these groupings, and other attributes determined for the individual system entities, to identify and associate relevant security policies for the entities. Further, security tools deployed either remote from (e.g., security tools 242) or locally (e.g., agent 244) on various computing devices (e.g., 220, 225, 230, 235, 240) can be used to enforce security policies for the system entities (e.g., network, system, application, and person entities).

An example asset management system 205 can include one or more processors devices 245 and memory elements 248 used to execute functionality included, in some implementations, in one or more components of the asset management system 205. For instance, in one example implementation of an asset management system 205, an asset repository manager 255, policy administrator 260, and enforcement coordinator 265 can be provided. An asset repository manager 255, for example, can include functionality for building and maintaining an asset repository 250 including records describing system entities discovered within the computing environment using, for instance, one or more asset detection engines 210. An asset repository manager 255 can include a detection engine interface 256 that can allow the asset repository manager 255 to interface with asset detection engines 210 deployed within the computing environment and obtain results from the asset detection engines identifying newly discovered system entities within the computing environment, as well as attributes detected for the system entities, such as address data and other information. Other devices and services can also be used by asset management system 205 in connection with the discovery of system entity attributes, such as various scan engines 290 adapted to receive scan scripts from asset management system 205 and perform more specialized scans of discovered system entities (e.g., to identify application, users of the computing devices 220, 225, 230 and applications and so forth). Further, asset repository manager 255 can additionally include a tagging engine 258 adapted to assign tags or taxonomies to discovered system entities within the asset repository so as to expand and modify the types of relationships between system entities beyond the default relationships defined in the asset repository's default or original organization scheme.

Figure 3:
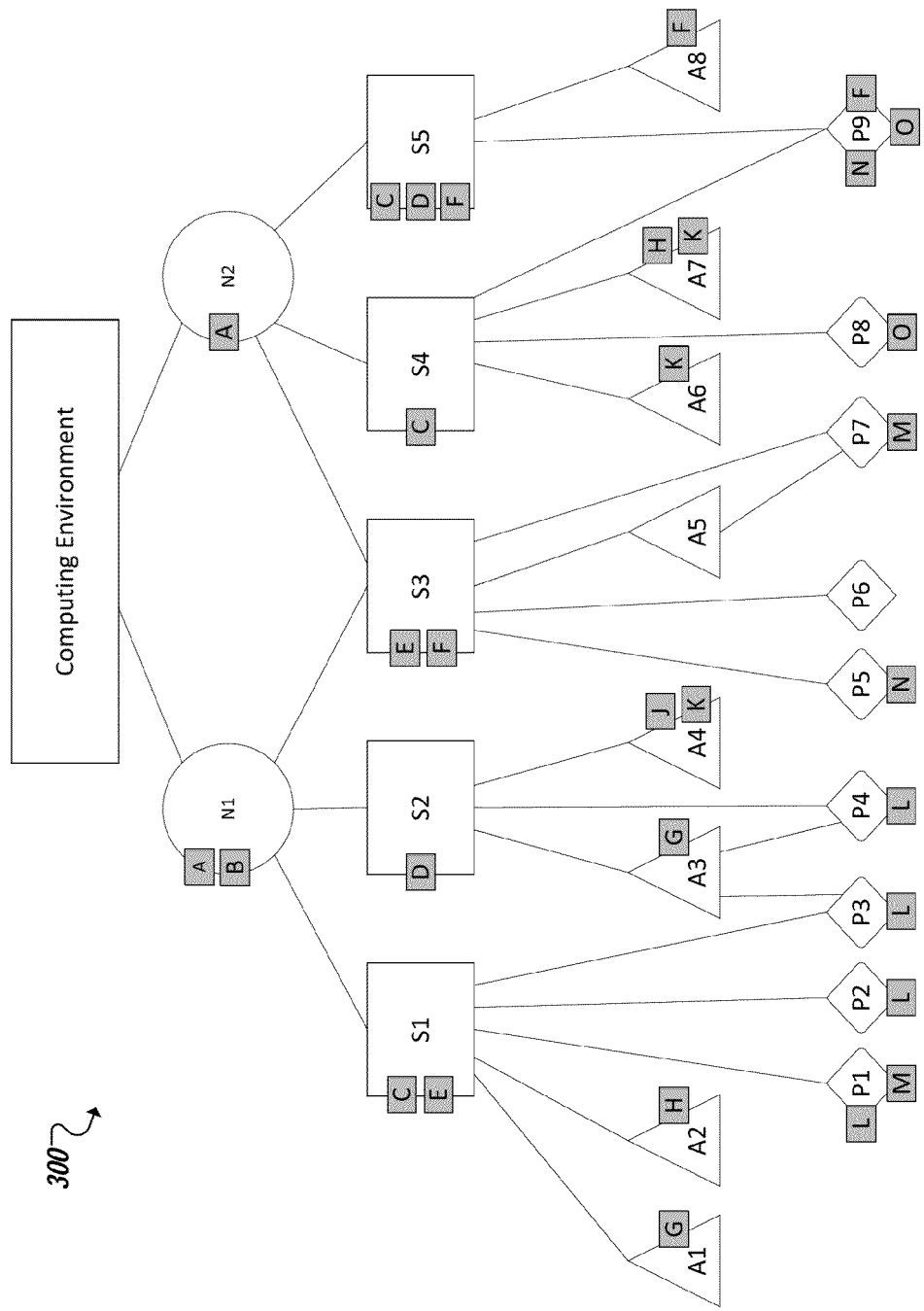
FIG. 3 is a simplified organizational diagram illustrating an example asset repository of an example system in accordance with at least one embodiment.

Turning to FIG. 3, a block diagram 300 is shown representing a hierarchically-organized asset repository. In some implementations, such as the example of FIG. 3, asset repositories (e.g., 250) can be organized in a hierarchy corresponding, at least approximately, to the physical implementation of system entities within a given computing environment. A hierarchical asset repository can be used to define at least some of the relationships between system entities within the computing environment. For instance, networks (e.g., network-typed system entities) can contain multiple computing devices and network elements typed as system-type entities (or "systems"). In some instances, the relationships between networks and their children systems can be many-to-many (with some systems migrating between multiple networks and networks typically including multiple constituent systems). Further, system devices can be regarded as containing software programs typed as "applications." Again, the relationships between system devices and applications can be many-to-many. Further, persons identified within the computing environment can be considered "children" of systems and/or application within the context of the hierarchy of an example asset repository.

As an example illustration, the block diagram 300 shows a representation of a hierarchical asset repository for a simplified computing environment including a plurality of networks (e.g., N1, N2), a plurality of system computing devices (e.g., S1, S2, S3, S4, S5), a plurality of application software programs, data structures, and services (e.g., A1, A2, A3, A4, A5, A6, A7, A8), and a plurality of persons (e.g., P1, P2, P3, P4, P5, P6, P7, P8, P9). As illustrated in this particular example environment, systems can belong to one or more networks (e.g., system S3 belongs to both networks N1 and N2), applications can belong to, be hosted or served by, or otherwise be provided in connection with one or more of the system computing devices (e.g., application A1 is hosted by system S1), and persons can be associated with one or more of system computing devices and/or particular applications within the computing environment (e.g., person P7 is associated both with system S3 and application A5, and person P9 is associated with both systems S4 and S5, etc.), among other examples.

A variety of other organizational schemes can be adopted for an asset repository identifying a base set of relationships among system entities. For instance, other hierarchical asset repositories can catalog the system entities of a computing environment to define other dependencies and hierarchies other than network:system:application, etc. For instance, an asset repository can be maintained that hierarchically organizes system entities by geography. For instance, a single system entity (or "asset") can be defined as being within a particular office in Belfast which is hierarchically related to an enterprise's operation within Ireland, which is contained within the enterprise's Western Europe region, etc., among many other possible examples.

While an asset repository can be used to initially organize a set of system entities into some logical arrangement, defined, for instance, at least in part on known relationships between the entities (e.g., a system is included in a network, etc.), more nuanced, dynamic, and less-traditional groupings can also be defined for the system entities on top of the relationships and entity attributes modeled in the structure of the asset repository itself. This can be achieved, in some examples, through tagging or taxonomies. Such tags, taxonomies, categories, etc. (referred to herein collectively as "tags") can be custom-defined allowing for user- or enterprise-specific groupings of system entities. In this manner, a reusable asset repository template or system can be offered to multiple enterprises and organizations in the cataloguing of system entities within their respective computing environments. Tagging can additionally allow the enterprises to define additional relationships between the system entities. Not only this, but tags can also capture more standardized, alternate relationships and commonalities between particular system entities outside of the relationships defined in the default organization or structure of the asset repository. As examples, tags can be applied to all system devices having a particular version of a particular operating system. In another example, tags can be assigned to each of a subset of computing devices (or networks, or applications, or all of the above) identified as "critical," or otherwise of particular importance or interest within one or more security contexts. Systems and/or persons can be tagged according to geographic locations with which they are associated. Systems can be tagged according to device type, manufacturer, age, usage rate, and other device-centric attributes. Applications can be tagged according to type (e.g., database, webpage, web service, internal, public, private, etc.), capabilities, number of users, and other application-centric attributes. Similarly, networks can be tagged, and persons can be tagged according to user-centric attributes such as role, permission level, tenure within the computing environment or organization, demographics, etc.

The example of FIG. 3 illustrates the tagging of various system entities within a (pre-existing) asset repository. For instance, tag A (305) has been applied to networks N1 and N2, while tag B (310) has been applied to network N1. Tagging can take place once the system entity has been discovered or otherwise identified and included within the asset repository. In some instances, system entities can be tagged substantially concurrently with the discovery and recording of a system entity within an asset repository. Tagging of system entities can be done manually, with administrator users identified or creating tags and associating them with particular entities. Tagging of system entities can also be at least partially automated. For instance, tags can be automatically applied to system entities according to rules set for the tags. For instance, a rule can be defined (e.g., by a user) to automatically apply tags to any system entity detected as possessing one or more particular attributes, including attributes discovered using asset detection engines, scan engines, and other software- (and hardware-) based tools used by an asset management system (e.g., 205). Determining that a new, previously undiscovered, or already-discovered system entity possesses such attributes can result in the tag(s) being applied to the system entity.

System entities that share a particular tag can be grouped into a corresponding set of system entities. For example, applications A4, A6, and A7 may all be tagged with a tag K assigned to application-type system entities that are databases within the computing environment. Consequently, databases within the computing environment can be conveniently identified from the tags and database-specific security policies, scans, and policy enforcement techniques can be applied specifically to the system entities tagged with tag K, as an example.

A wide variety of security policies can be available to be applied to system entities within a computing environment. For instance, security policies can specify website, files, and other data that can be accessed within a particular network, by a particular device, by a particular user or application. Security policies can dictate who can access particular files and data, what they can do with the data (e.g., save to external media, modify, email, send, etc.). Additional security policies can specify the level and type of encryption during certain transaction, the length and type of passwords used for certain devices, applications, and network, and other minimum security parameters, among other examples. Additionally, in some examples, security policies can be directed to security compliance rules, such as compliance standards set by government and administrative bodies, standards-setting organizations, industry standards, and other rules, among other examples. Some policies can be network, user, application, or device-specific. Some policies may only be relevant to system entities possessing certain characteristics, such as where, when, and by whom they are used, their capabilities, etc. Accordingly, attributes of system entities discovered using asset detection engines and scan engines can be used to automatically assign particular security policies to particular system entities.

Returning to the discussion of FIG. 2, asset management system 205 can further include a policy administrator 260 that can be used to define and apply security policies to system entities identified and catalogued in asset repository 250. In some examples, a policy administrator 260 can include a policy assignment engine 264 and policy enforcement engine 265. A library of security policies 262 can be maintained and built using policy administrator 260. In some implementations, security policies 262 can include standard security policies (e.g., generally applicable across computing environments), as well as environment-specific security policies. Indeed, in some examples, policy administrator 260 can include functionality allowing administrator users to define and generate new, customized security policies for their respective computing environments. Further, a policy assignment engine 264 can be used to create and maintain associations between various policies (e.g., 262) and security entities identified within the computing environment (i.e., within asset repository 250). Further, an enforcement engine 265 can be provided defining how particular security policies are to be enforced within the computing environment.

In some instances, policy enforcement engine 265 can be used to interface with a variety of security tools (e.g., 242, 244) deployed within the computing environment. Security tools can be deployed remote from system entities (such as system-type entities 220, 225, 230, 235, 240) allowing for policy enforcement to take place remote from and behalf of the target device, application, or person, thereby allowing security enforcement without the policy (or enforcement) being pushed to the target itself. This can be useful, for instance, in the security enforcement of mobile devices that move on and off of a monitored network, as well as unmanaged devices, such as devices not including agents or other local security tools capable enforcing important security policies. Such security tools 242 can include, for example, firewalls, web gateways, mail gateways, host intrusion protection (HIP) tools, network intrusion protection (NIP) tools, anti-malware tools, data loss prevention (DLP) tools, system vulnerability managers, system policy compliance managers, asset criticality tools, intrusion detection systems (IDS), intrusion protection systems (IPS), and/or a security information management (SIM) tool, among other examples. Further, enforcement engine 265 can further enable patches, updates, and other data to be pushed to target system entities in connection with security management of the computing environment, based on attributes of the targets identified using sensors 280, 285, scan engines 290, etc. Additionally, local security enforcement can also be performed, for instance, through agents or other tools (e.g., 244) running, loaded, or otherwise interfacing directly with a target device and providing asset management system 205 (e.g., through enforcement engine 265) with an interface for enforcing policy directly at the target device.

Each system entity can have fundamental characteristics that are atomic to it. For instance, for system-type system entities, such characteristics, or attributes, can include an IP address (or IP addresses), corresponding media access control (MAC) address(es), fully qualified domain name (FQDN), operating system(s), etc. Knowing such characteristics can be a precondition for effective risk analysis and security enforcement to occur. Gather the entity attributes can involve a variety of techniques. For instance, agents can be deployed in networks, systems, and applications that can harvest entity attributes directly from the system entities.

While accurate and convenient, not all system entities are "managed," in that they have an agent (or are able to have an agent). System entity attributes can also, or instead, be gathered over networks by performing remote assessments of each system entity. While either approach can be used, or both approaches in combination, the existence of the system entities, in particular system-type entities, should first be established.

When a system entity joins a network, security processes protecting and governing the network should become aware of its presence as immediately as possible. In a managed environment, this is fairly easy to accommodate since agents (e.g., 244) on each entity can notify the asset management system 205 directly. However, in the case of unmanaged assets, discovery of the system entity within the environment is facilitated through discovery processes available to and in communication with asset management system 205.

An asset detection engine (e.g., 210), and other network discovery tools, can consist of a grouping of technologies that allow the existence of assets on the network to be ascertained. Examples of such tools are ping sweepers, dynamic host configuration protocol (DHCP) monitors, address resolution protocol (ARP) cache farmers, etc. These tools can include active or passive tools that either actively or passively monitor the environment searching for new assets. Once a new asset is identified, the tool can notify the asset management system 205 permitting further asset attribute identification processes to begin (or continue).

In traditional computing environments, including environment employing IPv4 addressing, asset identification can include communicating with agents of managed devices to determine atomic characteristics of the device. Additionally, or alternatively, each possible IP address can be pinged to identify other potential (e.g., unmanaged) assets and their attributes from responses to the pinging. In response, the atomic characteristics of an identified potential asset can be compared against attributes of entities already documented with an asset repository (e.g., 250) to attempt to match them to an existing asset in the system, or else add them as a new system to the asset repository (e.g., 250).

To attempt to insure against unmanaged devices going undetected and unsecured, brute-force address ping-sweeps can be used. However, in some instances, ping-sweeping can be susceptible to some devices being missed, such as devices with transitory network connections or changing addresses. Further, in computing environments employing IPv6 addressing, ping-sweeping or address-sweeping can be an impractical solution for discovering unmanaged devices in the computing environment.

Implementations of the systems described in the examples of FIG. 2 and elsewhere in this disclosure address the above discussed shortcomings of traditional systems, as well as others. For instance, an asset detection engine 210 can be a network-attached device or software system deployed to automatically discover live network devices using one or more of a plurality of discovery techniques, including passive discovery techniques available to the asset detection engine 210 and thereafter trigger additional activities (e.g., using asset management system 205) and in some cases according to a defined sequence. Such additional activities can include, for example, the inventorying of network-facing services, assessing the system for vulnerabilities, inventorying installed software, applying software patches, installing new software, and so on.

In some instances, one or more asset detection engines (e.g., 210) can possess functionality that passively monitors a network for various activities which includes the communication or identification of one or more device addresses. The identified addresses can then be extracted from the monitored information and further used to ping, probe, and otherwise communicate with the devices at the identified address to identify whether the device is recorded within the asset repository 250 and to discover additional attributes of the devices. Further, detection of devices (i.e., system-type entities) can lead to the detection of other entity types, including application-type entities and person-type entities. Application-type and person-type entities can also be detected independent of the detection of system-type entities, for instance, through the sniffing of network traffic and other techniques. For instance, web servers, databases, chat clients, media clients, media players, etc. can be detected by from traffic monitored using asset detection engines 210.

In some implementations, an example asset detection engine 210 can include one or more processors 272 and one or more memory elements 274 and be deployed within a network to perform multiple different discovery tasks associated with the detection of devices and addresses of devices within the network. In some implementations, an example asset detection engine 210 can be deployed, at least in part, as a hardware device that plugs into the network in-line (e.g., at a switch or router), in parallel (e.g., off a router span port), or, at least in part, as software that can be deployed throughout a subnet, such as on particular or arbitrary hosts within the network, on specialized hosts such as a network DHCP server, or in other deployments. The asset detection engine 210 can include a plurality of pluggable sensor components (e.g., 280, 285) that can be configured according to a blade-like architecture in that new sensors can be added or removed from a reusable asset detection sensor framework 275 in accordance, for instance, with the character of and tools available or preferred within the network. In this manner, as new sensors are developed or made available, the new sensors can be added to the sensor framework 275 to supplement (or replace) other sensor technology deployed through the sensor framework 275 of the asset detection engine 210.

In some implementations, the sensor framework 275 can provide for combinations of both active sensors 280 and passive sensors 285. Active sensors 280 can include sensors that involve directly sending traffic to devices and addresses in the network and testing responses to the traffic. Such active sensors can include hardware- and/or software-based sensor components with functionality adapted to perform multicast queries, ping-sweeps, and other examples. Passive sensors 285, on the other hand, can include sensor components with functionality that attempt to obtain address information for and identify devices within the network outside of communications with the devices or corresponding to the addresses themselves. Passive sensors 285 can include passive discovery type sensors, event-based discovery type sensors, and indirect discovery type sensors. Sensor framework 275 can include active sensors and passive sensors 285 of one or more types. Indeed, in some implementations, multiple sensors of the same type can be provided on a single sensor framework blade (e.g., 275). For instance, an example sensor framework can include one or more active sensors, two indirect discovery type passive sensors, an event-based discovery type sensor, etc. A minimum or optimized set of sensors can be dependent on the particular characteristics of the network being monitored or swept using the asset discovery engine 210, although, in general, the wider the variety of sensors included and utilized within a sensor framework 275, the more comprehensive the coverage and asset discovery results.

In some instances, active sensors 280 can include sensors adapted to discover devices within a network utilizing IP multicasting, including IPv6 multicasting. Multicast addressing, in the context of IP networks, is a technique for one-to-many communications where the sending of a message to a group of destination systems simultaneously results in routers creating copies of those packets for optimal distribution. Example multicast queries for IPv6 for discovering devices on the network can queries utilizing a link-local scope all-nodes multicast address (e.g., "FF02::1" prefix). For instance, an example active sensor can send a DHCPv6 UDP probe to port 547 at the multicast address FF02:0:0:0:0:0:1:2 to discover all DHCP servers and relay agents. In another example, an example active sensor can send an ICMPv6 query to the "all nodes" multicast address FF02::1 to discover systems on the local network. In still another example, an example active sensor can send an ICMPv6 query to the "all routers" multicast address FF02::2 to discover routers on the network, among other examples.

In other examples, one or more active sensors 280 included in sensor framework 275 can include sensors adapted to perform brute force address, or ping, sweeping to discover devices on a network. While generally ineffective for discovering devices in a typical IPv6 network, ping sweeping, or more generally address sweeping, can still be an effective means of detecting devices on small ranges of IPv6 addresses and on IPv4 networks. Ping sweeping can be particularly effective in detecting devices which are mostly silent and which have a fixed address. Ping-sweeping can utilize traditional ICMP ping-sweeping techniques, whereby one or more packets are sent to a potentially live address, among other techniques. If a response of a particular type is received, then the target address is considered live. Ping sweeping can include ICMP ping sweeping (for several packet types), sweeping for open ports using full TCP connection tests, sweeping for open ports using half-open (SYN) tests, and sending "nudge" packets to specific, known UDP ports, among other examples.

Further, while address sweeping can be applied to target-based address sweep discovery (e.g., targeting specific, known IP addresses or IP address range previously identified or selected based on passive discovery tasks of one or more asset detection engines 210), active discovery sensors can also continuously sweep address ranges to both discover newly active addresses and to verify that previously active addresses are still active or have become inactive, firing off events (e.g., attribute discovery attempt tasks using asset management system 205) to perform useful work in near real-time when state changes are detected.

Passive sensors (e.g., 285) can include latent discovery type sensors, event-based discovery type sensors, and indirect discovery type sensors. Latent discovery type sensors can include sensors adapted to latently monitor the network for various activities which include the communication or identification of device address information and extract the address information without direct contact with the host systems (i.e., corresponding to the address). Latent discovery sensors can include sensors adapted, for example, to monitor NetBIOS broadcast packets, monitor internet control message protocol (ICMP) traffic (including ICMP version 6 (ICMPv6) traffic), sniffing general network traffic, sniffing traffic via switch port mirroring (such as through a switch port analyzer (or "SPAN port")), among other examples. At least some latent discovery sensors can operate without a specific configuration (e.g., provided by an administrator end user). For instance, a latent discovery sensor adapted to intercept NetBIOS broadcast packets can determine address information, among other system entity attributes, of devices on a network. Many systems, including those based, for example, on Microsoft's Windows™ operating systems, can broadcast datagram packets to their local network, for instance, in connection with NetBIOS datagram distribution service for connectionless communication on UDP port 138, among other examples. NetBIOS datagram broadcast packets can identify the IP address and MAC address of the sending device from which the intercepted NetBIOS packets originate and can further include data, in some instances, that, when identified and processed, reveals the sending device's operating system among other information. Operating systems that can be reliably identified using this method include for instance Windows 9x/Me/NT 4.0, NetApp Device, Windows 2000, Windows XP, Windows Server 2003, Windows XP (64 bit), Windows Server 2008, Windows Vista, Windows Server 2008 R2, and Windows 7. Accordingly, a latent discovery sensor adapted to intercept NetBIOS broadcast packets can identify sending devices, their respective address data, and operating systems of the sending devices.

In another example, another (or the same) latent discovery type sensor can be adapted to monitor ICMPv6 traffic. Significant amounts of traffic can be generated and sent by IPv6 devices within a network via the ICMPv6 protocol. Properly adapted latent discovery type sensors can listen for particular types of multicast ICMPv6 traffic, such as neighbor solicitation packets and neighbor advertisement packets, to identify the addresses (i.e., MAC address and IPv6 addresses) of one or more devices identified in the traffic, among other examples.

In still another example, a latent discovery type sensor can be adapted to sniff general network traffic for address information that can be used to identify previously unknown devices in the network, or addresses previously unknown as used by previously identified devices in the network. IPv4 and IPv6 packets include source and destination address information, as well as source and destination ports and the respective MAC addresses of the source and destination. Accordingly, sniffing all network traffic can allow the discovery of new address data, and thereby also, new devices communicating over the monitored network. By passively sniffing all network traffic, new device addresses can be discovered whenever such devices communicate over the network. Sniffing general traffic can be problematic in some networks, however, as many contemporary networks are "switched," whereby network devices, and perhaps also the deployed asset detection engine 210, only receive broadcast packets, multicast packets, and packets directly addressed to the device hosting the asset detection engine. In other instances, port mirroring can be leveraged to identify previously known device addresses within a network. Some network routers and switches can be configured to forward or "mirror" all traffic on specific device ports, or even entire virtual local area networks (VLAN's), to another port on the switch, such as the Switched Port Analyzer (SPAN) and Roving Analysis Port (RAP), among other examples. Some implementations of a latent discovery type sensor useable in a sensor framework 275 can be adapted to sniff traffic on a configured SPAN port (or other traffic-mirroring port) of a network switch, thereby allowing the sensor to monitor all network traffic mirrored over the port including traffic directed at other devices in a switched network, without the sensor being physically connected to the mirroring port.

Passive sensors can also include event-based discovery sensors. Generally, event-based discovery sensors can register or otherwise interface with a network service to receive notification when one or more particular pre-identified types of event occur. The reporting or detection of such events (to or by the respective network service) can include the identification of device addressing information of interest to the asset management system 205, such as IP addresses and DNS names. Such events can include, for instance, DHCP server events, Microsoft Active Directory™ audit events, and firewall and intrusion prevention system (IPS) events, among other examples. Event-based discovery sensors can interface with the respective devices and systems recording such events and identify those particular events and event records that can be mined for address data for use in building or supplementing records of the asset repository 250.

As an example, one implementation of an event-based discovery sensor can include a sensor adapted to interface with one or more DHCP servers in a DHCP network environment. In a DHCP network environment, each time a system is turned on and joins the network it broadcasts a request to receive an IP address from the nearest DHCP server. The nearest server then generally allocates an address lease and informs the target (requesting) system what its address should be. Further, once the system's lease expires, it is removed from the DHCP server's list of active addresses. In some implementations, DHCP servers monitor and/or participate in this address leasing process, and an event-based discovery sensor can including functionality for interfacing with the DHCP server(s) and query records of the DHCP server, receive alerts and other messages from the DHCP server, or otherwise acquire information from the DHCP server regarding recent lease events involving devices in the network. For instance, some implementations of DHCP servers provide APIs to other devices and services (such as Microsoft DHCP Server's "DHCP Server Callout API") and log files (such as the Unix/Linux DHCP Server "dhcpd" logging leasing events), among other examples and implementations. Generally, information obtained by the sensor from a DHCP server can be used, in turn, to identify potentially new or previously unknown devices in the network.

In another example, an example event-based discovery sensor can be adapted to interface with an Microsoft Windows Active Directory server to obtain records of particular types of events recorded or identified by an Active Directory server. For instance, in an organization, when a user performs a login or logout of a system joined to an Active Directory domain, events can be created in the event log of the Active Directory server. Some particular events, and the logging of these events, can include the identification of IP address and DNS name information of one or more devices in the network. The event-based discovery sensor can extract this address data for use by the asset management system 205. For instance, logs of Active Directory events, such as those examples noted in Table 1 (and others not listed), can include address information for use in supplementing an asset repository 250:

TABLE 1

| Event Description | Windows 2008 Event ID | Windows 2003 Event ID |
| --- | --- | --- |
| A Kerberos authentication ticket (TGT) was requested | 4768 | 672, 676 |
| A Kerberos service ticket was requested | 4769 | 673 |
| Kerberos pre-authentication failed | 4771 | 675 |
| A Kerberos authentication ticket request failed | 4772 | 672 |
| The domain controller attempted to validate the credentials for an account | 4776 | 680, 681 |
| A session was reconnected to a Window Station | 4778 | 682 |
| An account was successfully logged on | 4624 | 528, 540 |

Additionally, event-based discovery sensors can also interface with firewalls, IPSs, and other security tools (e.g., 242) to obtain log and other information describing events monitored by the tools. For instance, firewalls are devices which allow or deny network transmissions, based on a set of user specified rules. Intrusion Prevention Systems (IPSs) are devices which do a deep packet inspection and generate events when specific traffic patterns are noted. IPSs can also modify or prevent such traffic. Both firewalls and IPSs can serve to notify network administrators in the event of a network attack, or help to actually prevent break-ins, the spread of viruses, worms, etc. In some implementations, an IPS or firewall can be additionally configured to generate an event relating to particular types or patterns of network traffic and generated events can include the creation of a record or message listing source and destination addresses, DNS names, and open ports involved in the traffic monitored in connection with the event. Further, event-based discovery sensors can be configured to interface with firewalls and IPSs to communicate with the services and receive reported events from the services including the detection of particular types of packets including address information, such as DHCP address requests, DNS name queries, among other examples.

Indirect discovery type sensors can also be included among passive sensors 285. Indirect discovery type sensors can be adapted to interface with and query various network services that record and maintain device address information to extract those addresses without direct contact with the corresponding hosts. Such target network services and devices can include, for example, simple network management protocol (SNMP) servers (e.g., SNMP management information base 2 (MIB2)), hosts' neighbor databases (e.g., via a netstat command), DHCP databases, and router-maintained neighbor information databases, among other examples.

In one particular example, an indirect discovery type sensor can be adapted to query a management information base (MIB) of an SNMP server (including MIB2). From a MIB2, a wealth of information can be obtained that can be used to further build up an asset repository 250. For instance, a MIB21 can be queried to obtain the SNMP server's ARP table and thereby also a listing of devices that the SNMP server/device has been in contact with over the local network, including the address information of the devices. A connection table can be obtained listing systems, their IP addresses, and ports that the SNMP server/device is connected to or has sent or received data. A route table can also be accessed together with details of how packets are routed from the device to others on the network, including IP addresses of other devices involved in the routing. Additional example data can also be obtained from SNMP devices and other SNMP queries can also reveal address information and other useful data of devices in the network within which the SNMP device communicates.

In another example, an indirect discovery type sensor can be adapted to obtain a command shell on a remote device in the network and issue a netstat command to obtain a list of systems in the network, by IP address, with which the remote device has connected to or exchanged data together with port information of the other systems. Other indirect discovery type sensors can be adapted to interface with DHCP servers and query databases kept by one or more DHCP servers to obtain address information of devices on the network. For instance, an indirect discovery type sensor can be adapted to identify DHCP systems on the network and use a remote API to query a DHCP server database (e.g., using DhcpEnumServers, DhcpEnumSubnets, DhcpEnumSubnetClientsV5, etc.) or access a DHCP lease list (e.g., flat text file least lists maintained in Linux systems) using, for instance, a remote command shell, among other examples. Additionally, some indirect discovery type sensors can also query routers for device address information, for instance, by querying an "ipv6 neighbors information database" of various routers within the network. Such a database can maintain listings of IP addresses and MAC addresses known to the respective router (e.g., of all devices which have generated network traffic since the router was last initialized), which can be harvested using a corresponding indirect discovery type sensor. In some instances, such a sensor can be adapted to maintain and utilize specific connectors for each individual router or network device to be supported, as well as, in some instances, records of router credentials, type, and address.

Passive sensors 285 can include other types of sensors, such as address-mapping type sensors. An address-mapping type sensor can be adapted to use address data from the asset repository 250 or discovered using one or more other active or passive sensors (e.g., 280, 285) to query other network devices, such as DNS servers, routers, IPS, or firewalls, to discover additional address information for discovered devices. Generally, through such queries, a single device address can be mapped to one or more other addresses for the device. Such other address information can included, for instance, one or more human-readable names (e.g., DNS names), one or more logical device addresses (e.g., IP addresses), one or more physical device addresses (e.g., MAC addresses), etc.

In some instances, one or more address-mapping sensors can be included in sensor framework 275 that are adapted to perform DNS server queries using address data obtained from the asset repository 250 and/or through one or more other sensors 280, 285 in asset detection engines 210 deployed within a corresponding computing environment. DNS servers can forward-map from a human-readable device name (e.g., DNS name) to all logical addresses for the named device. In addition, DNS servers can also reverse-map from one logical device address back to the DNS name for a device. Thus, given a single IP address, additional addresses can be discovered by first doing a reverse lookup of the DNS name for that address, then doing a forward lookup for all IP addresses for the returned DNS name for the device.

In other examples, address-mapping sensors can be adapted to query other network systems and databases to perform address-mappings and discover additional address data for devices within a computing environment. For instance, a local IPv4 ARP cache, an IPv6 destination cache, or an IPv6 neighbor cache, among other examples, can be queried by address-mapping sensors to discover additional addresses for previously identified devices in a network. For instance, the local ARP cache of any system can be used to map from an IPv4 address to a corresponding system's MAC address for any IPv4 address that the system has previously communicated with. Additionally, utilizing this cache allows this mapping to occur without incurring the cost of asking the local network router to provide this translation. Further, in an IPv6 environment, the destination cache and neighbor cache can be similarly used to identify MAC addresses of a device identified by one or more IPv6 addresses, among other examples. In addition, this information can be retrieved remotely via, for example, PowerShell v2, to farm additional destination addresses from any system to which remote access can be obtained. Further, address-mapping sensors, like other sensors, can be further adapted to maintain credentials and configurations for authenticating to and accessing the network devices and databases maintaining event, device, and address information in various forms throughout the computing environment.

Figure 4:
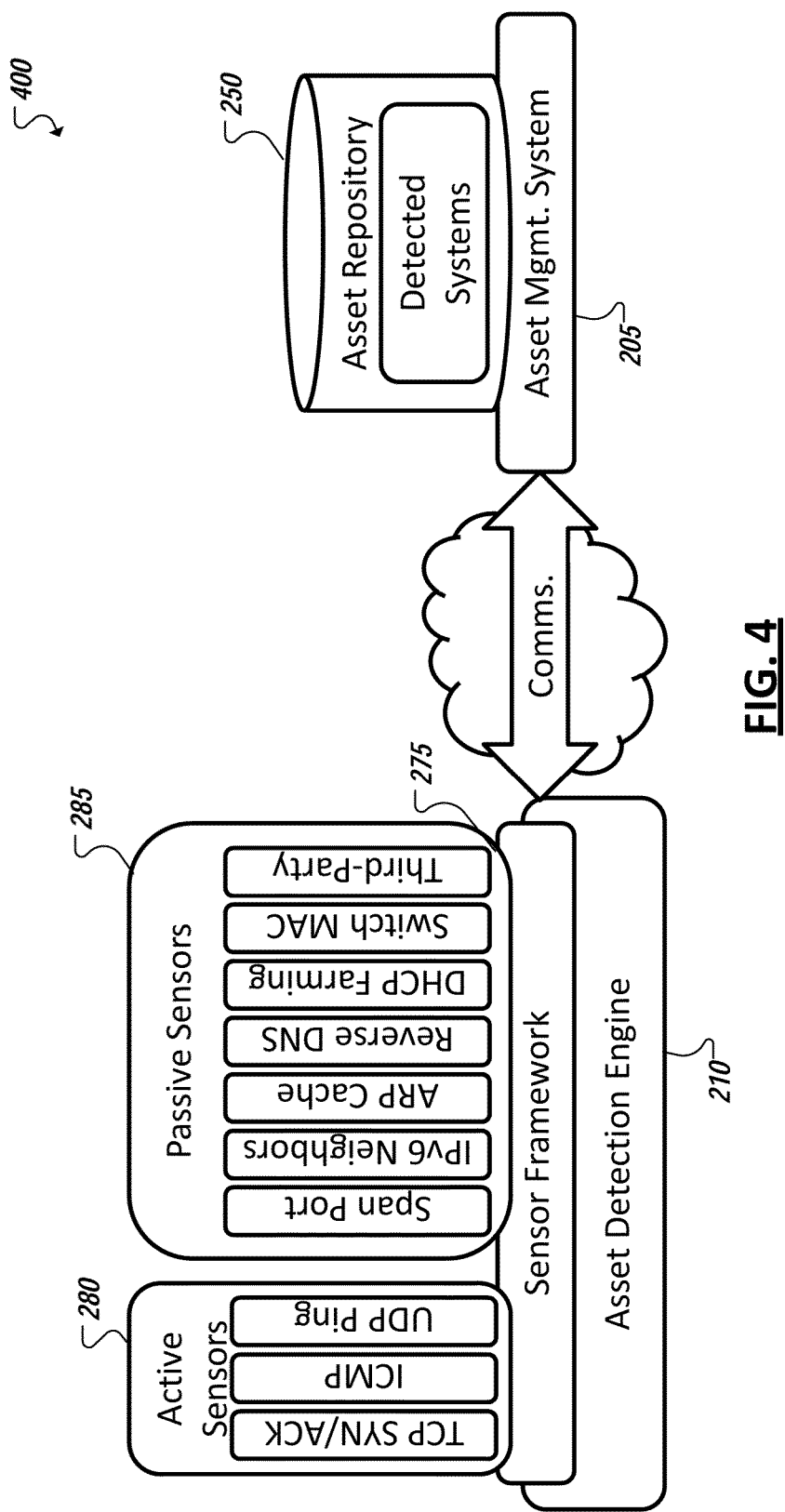
FIG. 4 is a simplified block diagram illustrating an example expandable asset detection engine in communication with example asset management system in accordance with at least one embodiment.

Turning to FIG. 4, a simplified block diagram 400 is shown of an example expandable asset detection engine 210 in communication with an example asset management system 205. As in the example of FIG. 2, the asset detection engine 210 can include a sensor framework or platform is adapted to accept and use a variety of active and passive sensors (e.g., 280, 285) that the asset detection engine 210 can use, in combination, to identify devices and extract corresponding device address information from networks on which the asset detection engine (and its component sensors 280, 285) are deployed. Further, sensors can be conveniently added, removed, or replaced on the sensor framework, allowing the functionality of the asset detection engine 210 to be expanded, modified, and otherwise tailored to the network on which the asset detection engine 210 is deployed (e.g., based on the network devices and services available on the network with which the asset detection engine sensors can interface).

In one illustrative example, shown in FIG. 4, an example asset detection engine 210 can include both active and passive sensors 280, 285 pluggably deployed on the asset detection engine. For instance, among the pluggable active sensors 280 deployed on the asset detection engine 210, a TCP SYN/ACK active discovery sensor, an ICMP ping sweep sensor, and a UDP ping sensor can be provided. In some instances, a TCP SYN/ACK sensor can send a set of one or more TCP packets (such as SYN packets, TCP full connect packet sequences, etc.) to addresses within the network. In some instances, a TCP SYN/ACK sensor can target particular ports identified as more likely to be in use within the network and send TCP SYN packets to each identified port for each target IP address. Target devices that respond with a TCP SYN ACK can be identified as live devices triggering further attribute probing of the target device. An ICMP ping sweep sensor can be adapted to send ICMP ping requests to each target IP address and listen for responses to identify live devices on the network. UDP ping sensors can be adapted to send particular UDP packets to target devices that are designed to elicit responses from particular services predicted to be used and associated with particular ports of the target device. The UDP ping sensor can then listen for responses to the sent UDP packets to identify live devices on the network.

Further, in the example of FIG. 4, a variety of different pluggable passive sensors 285 can also be provided on asset management engine 210. For instance, in the particular example of FIG. 4, a set of passive sensors, each attempting to discover IP address information passively in a particular manner, can include a SPAN port sensor, IPv6 neighbor query sensor, ARP cache query sensor, reverse DNS lookup sensor, DHCP farming sensor, switch MAC sensor, among others. Additionally, sensors can also be provided and implemented on an expandable sensor framework that are adapted to work with (and that are, in some cases, provided by) third party developers of products and services that also capture and maintain records of address data within the system. Further, as each sensor on asset detection engine 210 identified device address data for a network, the results can be passed through asset detection engine 210 for processing by asset management system 205.

Upon receiving device address data obtained by one or more asset detection engines 210 deployed within a computing environment, asset management system 205 can check the asset repository to see if the address data has already been identified, add address data that has not yet been discovered (e.g., for an already discovered device in the repository), and update or confirm previously identified address data based on the results received from the asset detection engine(s) 210. Further, asset management system 205 can process data received from asset detection engines 210 and determine, from commonalities in the certain returned data, that new address information obtained by the asset detection engine corresponds to a previously discovered device on the network. Additionally, in the event that the address information is determined to correspond to a device not already identified within the asset repository, the discovery of the address information can be considered to represent the discovery of the device itself within the network.

Devices and address data (such as discovered IPv6 addresses) can be used by the asset management system 205 (or in some implementations the asset detection engine 210 itself) to trigger additional probes and sensor activities using asset detection engine sensors (e.g., 210). For instance, an asset management system 205, upon identifying new IP addresses can cause address mapping sensors to perform address mapping queries to identify additional IP addresses and/or MAC addresses for the device corresponding to the newly-discovered IP address. In other instances, the newly discovered address data can be passed to other sensors on an asset detection engine (e.g., by the asset detection engine 210 or asset management system 205) to attempt to discover additional information corresponding to a target device. Indeed, in some examples, address data discovered through passive sensors 285 can be passed to active sensors 280 on the asset management system 205 for use by the active sensors as target addresses in their active discovery techniques. For instance, active sensors 280 can be used to verify (and periodically re-verify) that a device at a particular address is live or active within the network, monitor devices as they come on- and off-line, and monitor the state of the device associated with the address.

In some instances, in order to determine if a device changes state from on-the-network to off-the-network, or vice versa, the previous state detected for each device can be maintained, so as to provide a point of comparison. This can be done, for example, by keeping an in-memory table or database on disk of the asset detection engine 210 (or within the asset repository 250), containing the last detected state of each known device. As devices are discovered to be alive and on-the-network (e.g., using active discovery sensors (e.g., 280)), a device state table is checked. If no entry exists or the entry for a device indicates it is off-line, an entry is added or the existing entry updated to indicate the new device state. Regardless, the entry in the device state table can be time-stamped to indicate the last time the device was detected as being alive and on the network.

Further, each address indicated as being alive can be periodically probed via one or more active discovery sensors. If the address is detected as being alive, then the corresponding entry in the device state table can again be time-stamped to indicate the last time the device was detected as on the network. If the address was previously detected as being on the network via an active discovery sensor, and it is no longer detected as being alive, then the entry for the device can be marked as now being off the network. If the device was never detected as being alive via an active method, the timestamp of the last time the device was seen as active via some other method is checked and, if the entry is detected as being stale (i.e., is older than some specified threshold value) then the device can be marked as being off line. As an optimization, if active discovery of a device fails a certain number of times, it can be disabled so as to conserve network, memory, and CPU usage.

Additionally, detection of a device changing state can cause an event to be generated indicating that the device is now either on or off the network. Any means of firing software events could be used here, as is well understood in the industry. Further, in some implementations, identification of a device included in asset repository 250 as online (e.g., through a corresponding generated event) can cause one or more scan engines to be alerted, activated, or deployed to perform one or more scans of discovered devices to determine even further information concerning the devices to be used, for instance, in the assigning of tags, security policies, and security tasks to the devices.

Figure 5:
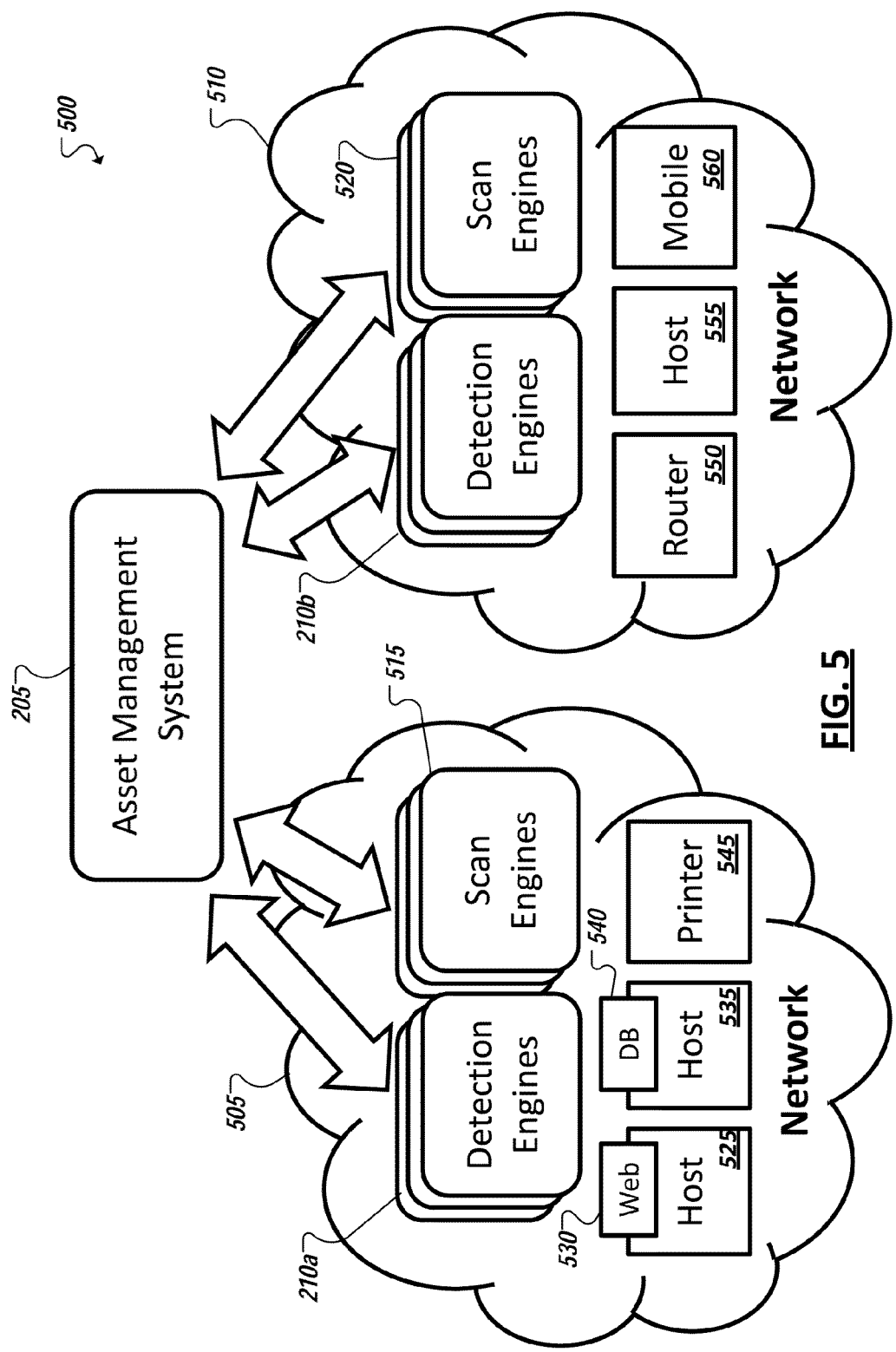
FIG. 5 is a simplified block diagram illustrating deployment of asset detection engines and scan engines in two or more networks of an example system in accordance with at least one embodiment.

As shown in the simplified block diagram 500 of FIG. 5, in some examples, a computing environment can include multiple networks and sub-networks (e.g., 505, 510) managed by an asset management system 205. Each network 505, 510 can have one or more asset detection engine 210a, 210b, but also one or more scan engines 515, 520 adapted to perform tasks on discovered devices, such as particularized, post-discovery scans to determine the operating system, hardware, ports, applications, vulnerabilities, users, and other information that can be used, for instance, in the identification of other system entities in the computing environment, including application-type entities and person-type entities. Such information can also be used in the assignment of security policies to particular networks, devices, applications, and persons within the computing environment.

As shown in the example of FIG. 5, each networks 505, 510 can include multiple asset detection engines (e.g., 210a, 210b). In some implementations, the asset detection engine 210a, 210b, itself may not possess the ability to scan or perform other discovery tasks absent the presence and use of one or more pluggable sensors. Indeed, asset detections engines 210a, 210b can each utilize a common sensor framework but have sets of sensors installed that are adapted to the particular characteristics and services of the network (e.g., 505, 510) they monitor. For instance, one asset detection engine can have a first set of sensors while a second asset detection engine, in the same or different network (e.g., 505, 510), can have a different, second set of sensors (where at least one sensor is included in one of the sets of sensors but not in the other). For instance, a sensor of an asset detection engine can pull data from, query, or otherwise interact with a particular device or service, such as a DHCP server, SPAN port, etc., included in a first network but not in a second network. Accordingly, in such an example, an asset detection engine in the first network can include sensors adapted to interact with the particular device or service, while the asset detection engine in the second network may omit such sensors. Additionally, some sensors may be integrated or implemented locally on a particular device or service and a corresponding asset detection engine may be limited in its ability to be communicate with other network service and thereby utilize other sensors that rely on the communication (or, in some cases, collocation) with the network service, among other examples. Consequently, in some instances, multiple asset detection engines may be deployed within a single network, each with a different set of sensors. Some different sets of sensors can include one or more of the same sensors. Additionally, while multiple asset detection engine 210a, 210b may be deployed within networks 505, 510 of an computing environment, the asset detection engine platform (e.g., sensor framework without sensors) can be identical across asset detection engines 210a, 210b allowing for the free addition (or removal) of sensors on each of the asset detection engines.

As noted above and elsewhere herein, discovery of a device and corresponding address information by an asset detection engine (e.g., using one or more sensors included on the asset detection engine) can be used by other services and devices, such as other asset detection engines and/or scan engines (e.g., 515, 520). Address information alone, in some instances however, can be insufficient to direct or trigger tasks by other asset detection engines or scan engines targeting a particular device. For instance, a single IPv6 address can be repeated in each of sub-networks 505 and 510, despite the networks 505, 510 residing within the same computing environment, such as an enterprise software environment. Accordingly, an asset management system 205 may utilize additional information to identify the proper scan engine or asset detection engine included in the network corresponding to the particular instance of the single IPv6 address.

As an illustrative example, in FIG. 5, host devices (i.e., system-type entities) are provided in each of networks 505, 510. For instance, a host device 525 hosting a website 530, a host device 535 hosting a database 540, and a printer device 545, among others, can be included in network 505. Further, a router 550, host device 555, and mobile computing device 560 can be included in network 510 in this particular example. In this particular example, host 525 and host 555 can possess the same IPv6 address. In order to identify and invoke the proper scan engine (e.g., one of scan engines 520) to probe host 555, asset management system 205 can maintain a mapping or other association of detection engines to scan engines. For instance, asset management system 205 can map asset detection engines 210a to scan engine 515 and asset detection engines 210b to scan engines 520, to thereby also identify the proper scan engines (or other asset detection engines) for hosts or other devices discovered by a particular asset detection engine.

Continuing with the previous example from FIG. 5, discovery engine 210b can identify the IPv6 address of host 555 and report the discovered address information to asset management system 205. Asset management system 205, in this example, can elect to perform additional probes and tasks using the returned IPv6 address to target a corresponding device (e.g., host 555) and obtain additional information regarding host 555. To accomplish this, asset management system can identify that the IPv6 address for host 555 was returned from asset detection engine 210b and consult a mapping to identify one or more scan engines 520 located in the same network as 510 and adapted to perform the desired task. Indeed, in some instances, an asset detection engine (e.g., 210b) itself can query or otherwise access the mapping to identify and directly invoke an associated scan engine (e.g., 520). For instance, in some examples, a defined sequence of tasks can be initiated by an asset management system (or asset detection engine 210a, 210b) involving a plurality of asset detection engines 210a, 210b and/or scan engines 515, 520. Performing the sequence of tasks can include identifying associations between the plurality of asset detection engines 210a, 210b and/or scan engines 515, 520 involved in obtaining information regarding addresses and other attributes of one or more system entities (e.g., 525, 530, 535, 540, 545, 550, 555, 560, etc.). The sequence of tasks can also be dependent on the results of prior tasks (e.g., whether and what type of address information or other attribute information was identified, whether the device is detected as being active, etc.).

A mapping of associated asset detection engines 210a, 210b and scan engines 515, 520 can be built using a variety of techniques. For instance, asset detection engines can be manually and explicitly associated with scan engines (e.g., by a user). In another example, asset detection engines and scan engines can be strictly associated (i.e., one asset detection engine to one scan engine, and vice versa) such as by deploying an asset detection engine in tandem with a scan engine, for instance, on the same host device. In still other examples, mapping can be automated. For instance, asset detection engines 210a, 210b and scan engines 515, 520 can each be identified in and mapped to one or more particular networks 505, 510 and an asset management system 205 can identify that particular address information (e.g., corresponding to a particular device, e.g., 550, 555, 560) is collected from a particular asset detection engine (e.g., 210b) within a particular network (e.g., 510). In other instances, particular asset detection engines 210a, 210b can be mapped directly to particular scan engines 515, 520.

In some implementations, address information collected by asset detection engines 210a, 210b can be used to associate asset detection engines 210a, 210b and scan engines 515, 520 (and/or to identify that an asset detection engine is in the same network as one or more scan engines, etc.). For instance, if a particular asset detection engine (from 210a) identifies address information known to the asset management system 205 to correspond to a particular device hosting one or more particular scan engines (e.g., 515), asset management system 205 can use the returned address information to confirm that a particular asset detection engine (e.g., 210a) is on the same network (e.g., 205) with the corresponding, particular scan engine (e.g., 515) and that the particular scan engine would consider address information of scan targets as corresponding to the network (e.g., 205), rather than confuse the scan target with another on a different network (e.g., 510), among other examples. For instance, scan engines and/or detection engines can identify traffic or behavior that resembles that of an asset detection engine or scan engine and thereby identify that they are each in the same network, or that the particular scan engine 515 is otherwise able to reach a particular target device corresponding to address information discovered by an associated asset detection engine.

Figure 6A:
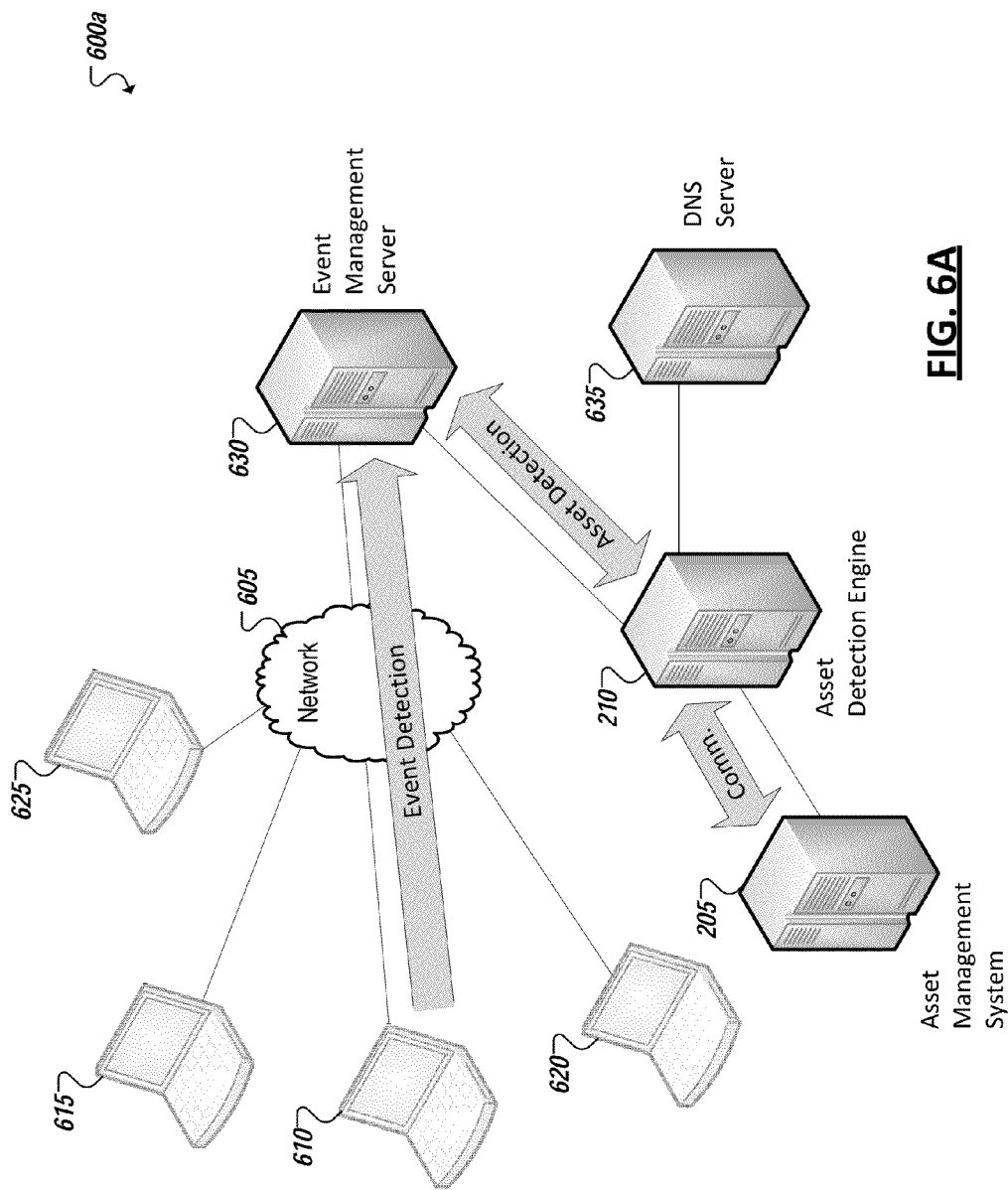
FIGS. 6A-6H are simplified block diagrams illustrating example operations including an example asset detection engine in accordance with at least one embodiment.

Turning to the examples of FIGS. 6A-6H, simplified block diagrams 600a-h are shown illustrating example operations including an example asset detection engine (e.g., 210). As shown in FIG. 6A, a plurality of undiscovered devices (i.e., system-type system entities) 610, 615, 620, 625 can connect to, communicate over, or otherwise operate in connection with a network 605 but be absent from an asset repository maintained by an asset management system 205 for use by the asset management system 205 in associating security policies to system entities and performing security tasks relating to the system entities, including the enforcement of assigned security policies. An asset detection engine 210, including a plurality of pluggable sensors, including passive and active sensors, can be used to identify the undiscovered devices within the network 605, together with address data of the undiscovered devices.

In the example of FIG. 6A, an event-based discovery sensor on the asset detection engine 210 can be used to identify one or more devices on the network. For instance, an event involving device 610 can be identified on the network by one or more network services, such as an Active Directory server, IDS, firewall, or other tool or service (e.g., event management server 630). An event management server 630 can detect, register, and record events on the network including address identifiers of devices (e.g., 610) involved in the detected event. In some instances, an event-based discovery sensor can be alerted of and/or forwarded event data for new events detected by an event management server 630. For instance, event management server 630 can forward particular events to an event-based discovery sensor that have been previously identified as likely including address information of devices in the network. In other instances, an event-based discovery sensor can interface with the event management server 630 and query event records of the event management server 630 to identify new event data and extract device address data from the event data. Such event data can then be processed by the asset detection engine 210 and sent to the asset management system 205. Further, asset detection engine 210 can receive instructions and other communications from asset management system 205, such as instructions to perform additional probes of discovered devices, such as active discovery probes or address mappings of a discovered IP address, DNS name, etc., according to one or more discovery task sequences (including multi-path discovery task sequence trees).

Figure 6B:
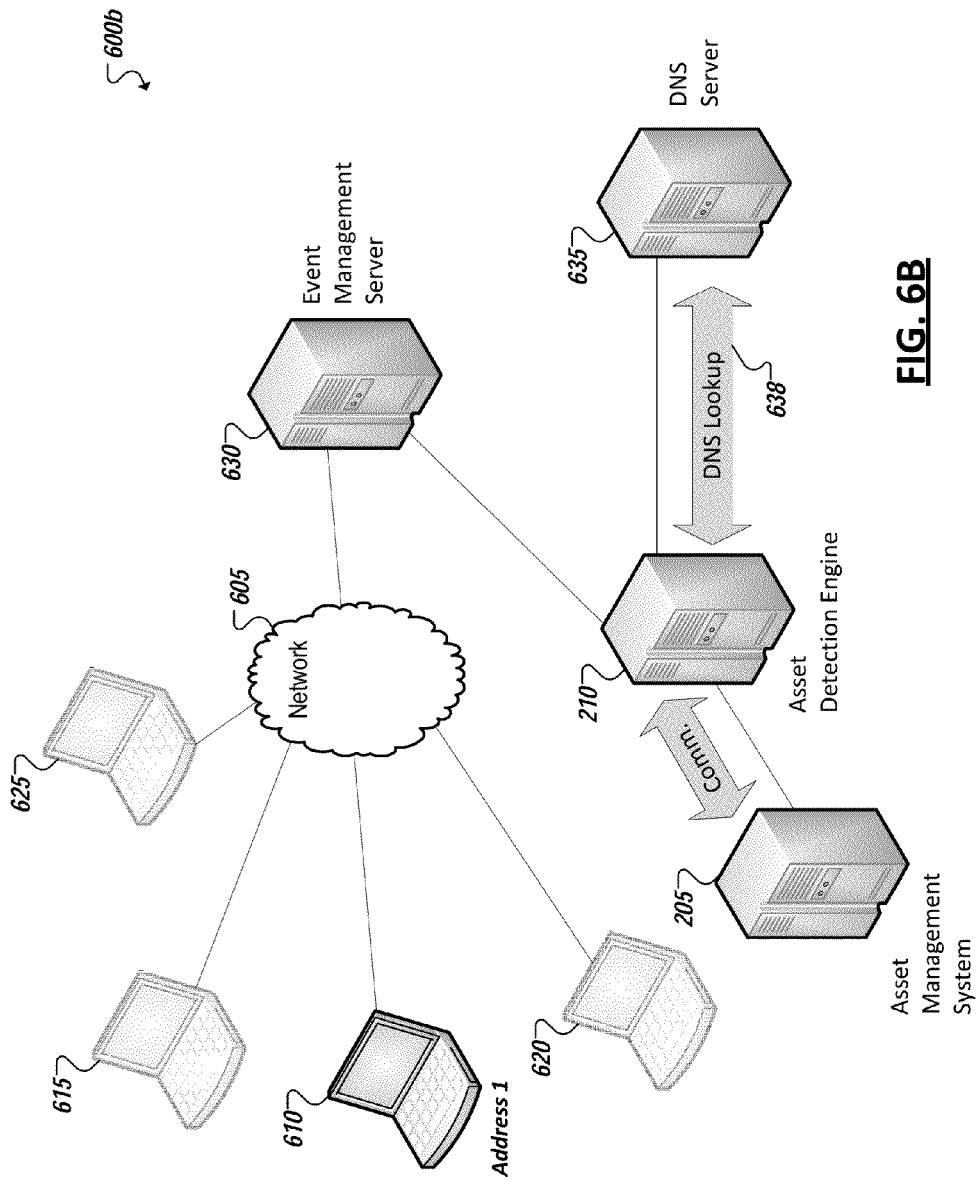
Figure 6C:
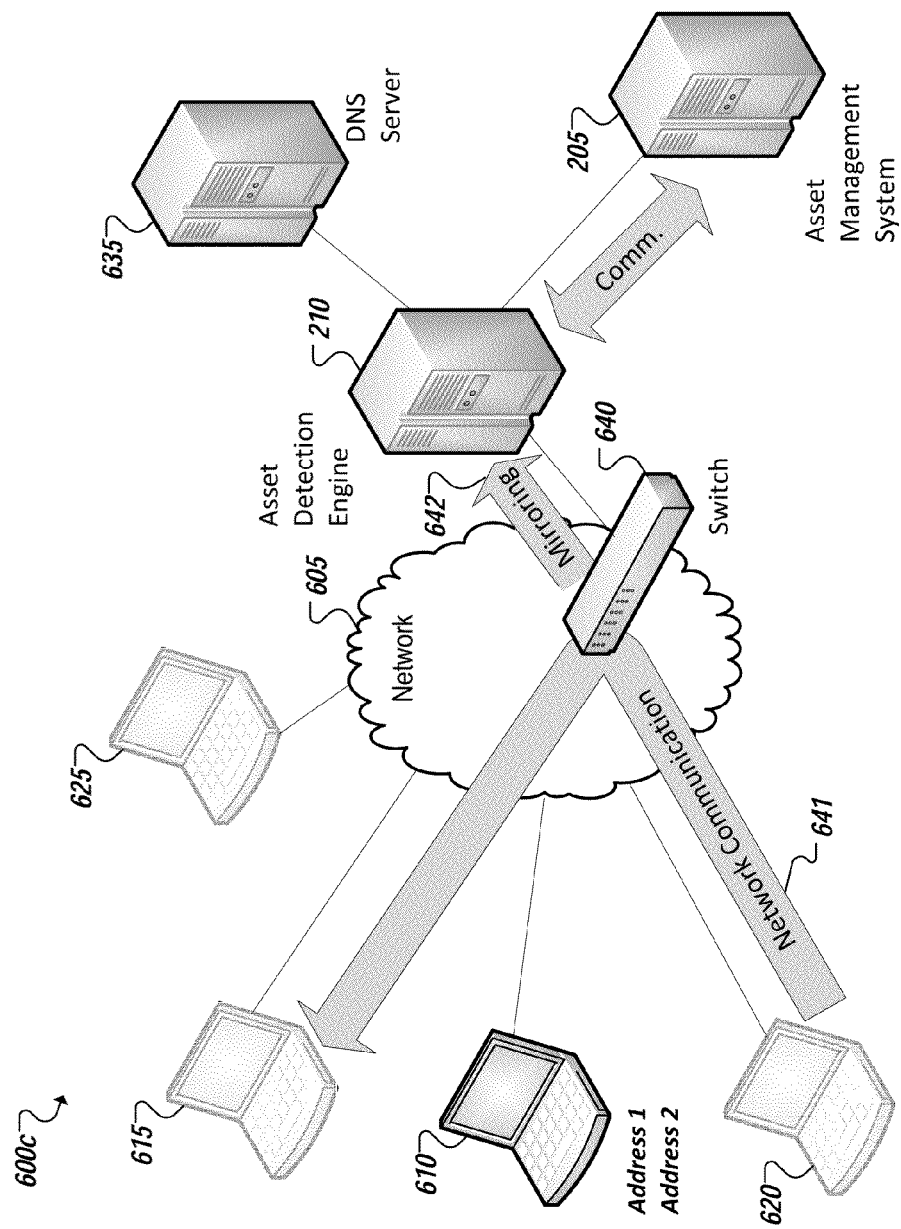

Turning to FIG. 6B, the discovery of device 610 is represented (i.e., presented in higher contrast than the representations of devices 615, 620, 625, a convention following throughout FIGS. 6A-6H) including address data "Address 1" discovered for device 610 by an event-based discovery sensor included with asset detection engine 610. As illustrated in FIG. 6B, the identification of device 610 and associated address information "Address 1" (e.g., an IPv6 address of device 610) can be further used by other sensors to obtain additional address information, as well as discover other attributes of device 610. Asset detection engine 210, in some examples, upon recognizing the discovery of particular address data can orchestrate further discovery tasks (e.g., using other sensors on asset detection engine 210). In other instances, asset management system 205 can drive the tasks performed by sensors of asset detection engine, such as tasks based on the discovery of new address information. For example, asset detection engine 210 can return the identification of "Address 1" for device 610 to asset management system 205 and asset management system 205 can process "Address 1" to determine whether the address information (and/or associated device) are already known. In either case, asset management system 205 can request additional discovery tasks, such as a DNS mapping or ARP mapping task, thereby invoking particular sensors on an asset detection engine (e.g., 210). For instance, as shown in the example of FIG. 6B, an asset detection engine 210 can use a DNS mapping sensor on the asset detection engine 210 to perform a reverse DNS mapping at a DNS server 635 utilizing the newly discovered "Address 1" as an input. The DNS server 635 can map Address 1, for instance, to a particular DNS name. Additionally, a DNS mapping sensor at asset detection engine 210 can additionally request a forward DNS mapping of the DNS name(s) returned for "Address 1" to determine if any other address data (e.g., IP addresses) are mapped to the DNS name mapped to "Address 1." In this way, (and according to such a sequence) a DNS mapping sensor can leverage a newly discovered IP address (e.g., an IPv6 address) to discover other IP addresses (e.g., "Address 2"), as well as other address data, such as a DNS name, for device 610. Indeed, as shown in the example of FIG. 6C, one additional address, "Address 2," has been returned for device 610 based on the DNS lookup 638 performed in the example of FIG. 6B.

Figure 6D:
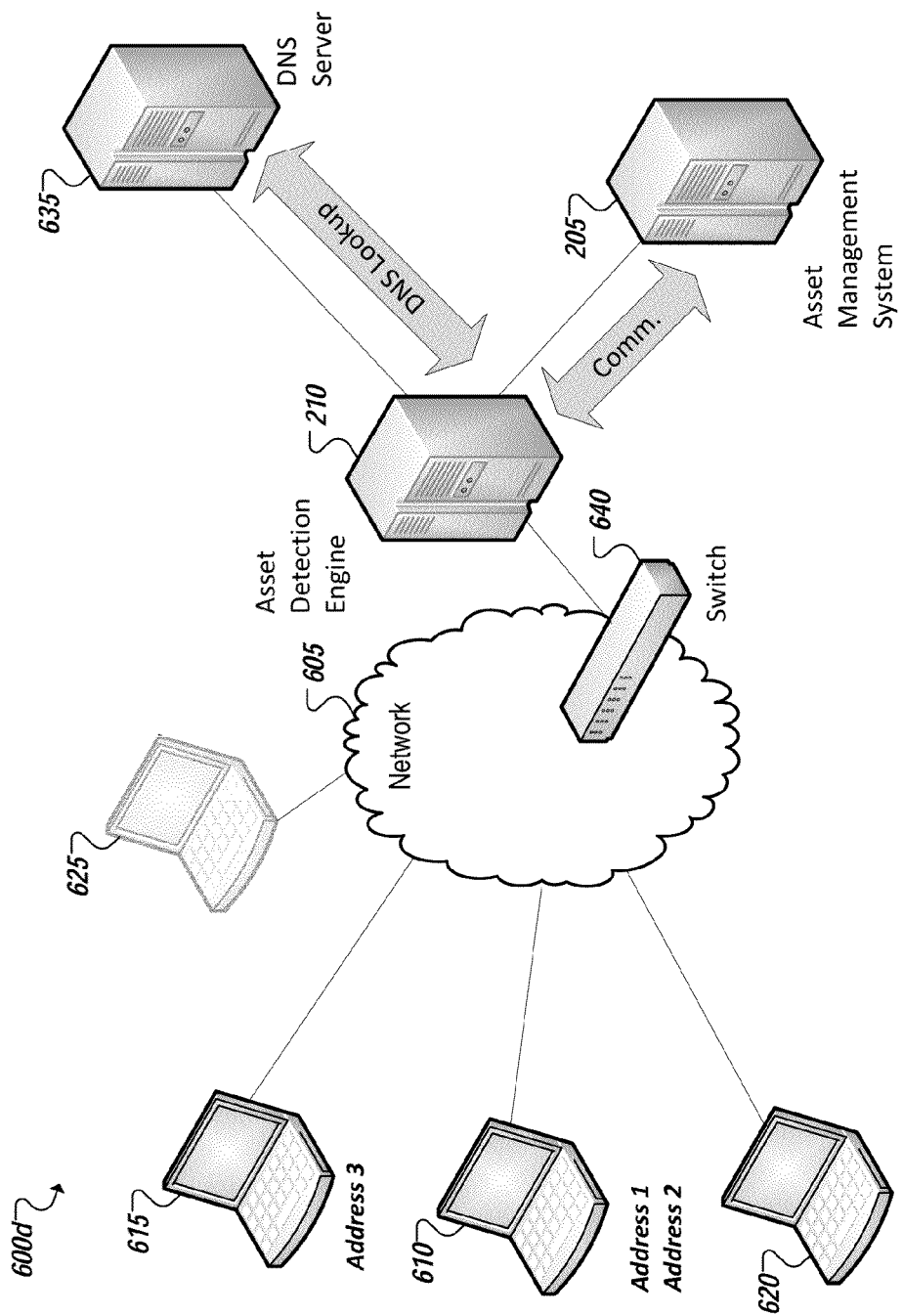

In the example of FIG. 6C, additional discovery tasks can be performed by sensors of asset detection engine 210, such as latent-type discovery tasks. For instance, asset detection engine 210 can include a SPAN port sensor, or other sensor, capable of listening to port mirroring at one or more switches, routers, or other network elements with a network 605. For instance, sensors of asset detection engine 210 can identify traffic across a switch 640 including the addresses of a source and destination of a particular network communication 641 using mirroring functionality (e.g., 642) at the switch 640. In this particular example, the source IP address discovered by asset detection engine can correspond to a previously unidentified device 620 (or a previously unidentified IP address of device 620) and the destination IP address can also be an IP address unknown to the asset management system 205 (i.e., an address not included in an asset repository maintained by asset management system 205) and correspond to another device 615. The IP addresses (e.g., "Address 3" and "Address 4") discovered by asset detection 210 using a sensor capturing port mirroring data (e.g., at a SPAN port of switch 640) can be communicated to asset management system 205, as shown in FIG. 6D. Further, as in the example of FIG. 6B, the newly discovered addresses "Address 3" and "Address 4" can be further used (e.g., in response to a command from asset management system 205) by an asset detection engine 210 to perform additional discovery tasks, such as an neighbor discovery request, ARP query, DNS mapping, etc. by another sensor on asset detection engine 210 (or another asset detection engine or scan engine of network 605) to discover additional addresses of discovered devices 615, 620 (e.g., "Address 5," "Address 6," and "Address 7") (e.g., based on a particular task sequence directed by the asset management system 205 and/or asset detection engine 210).

Figure 6E:
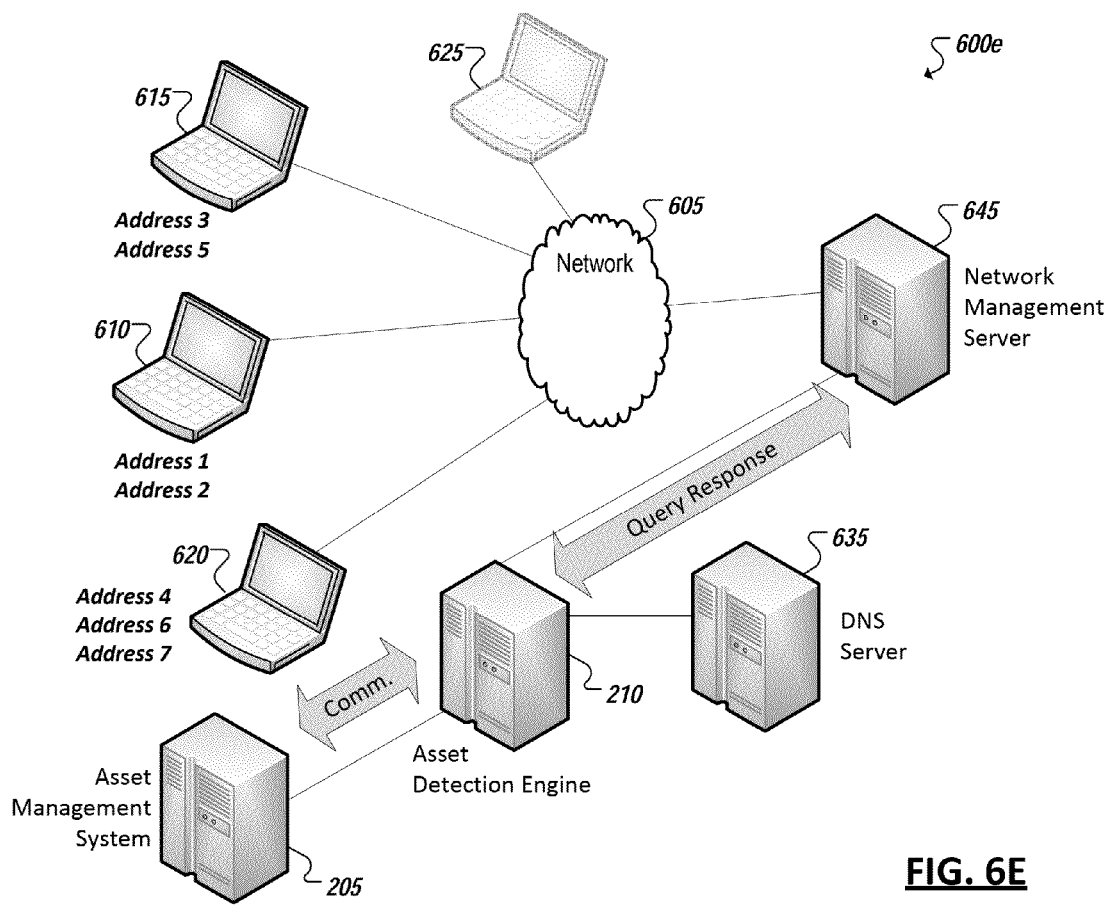
Figure 6F:
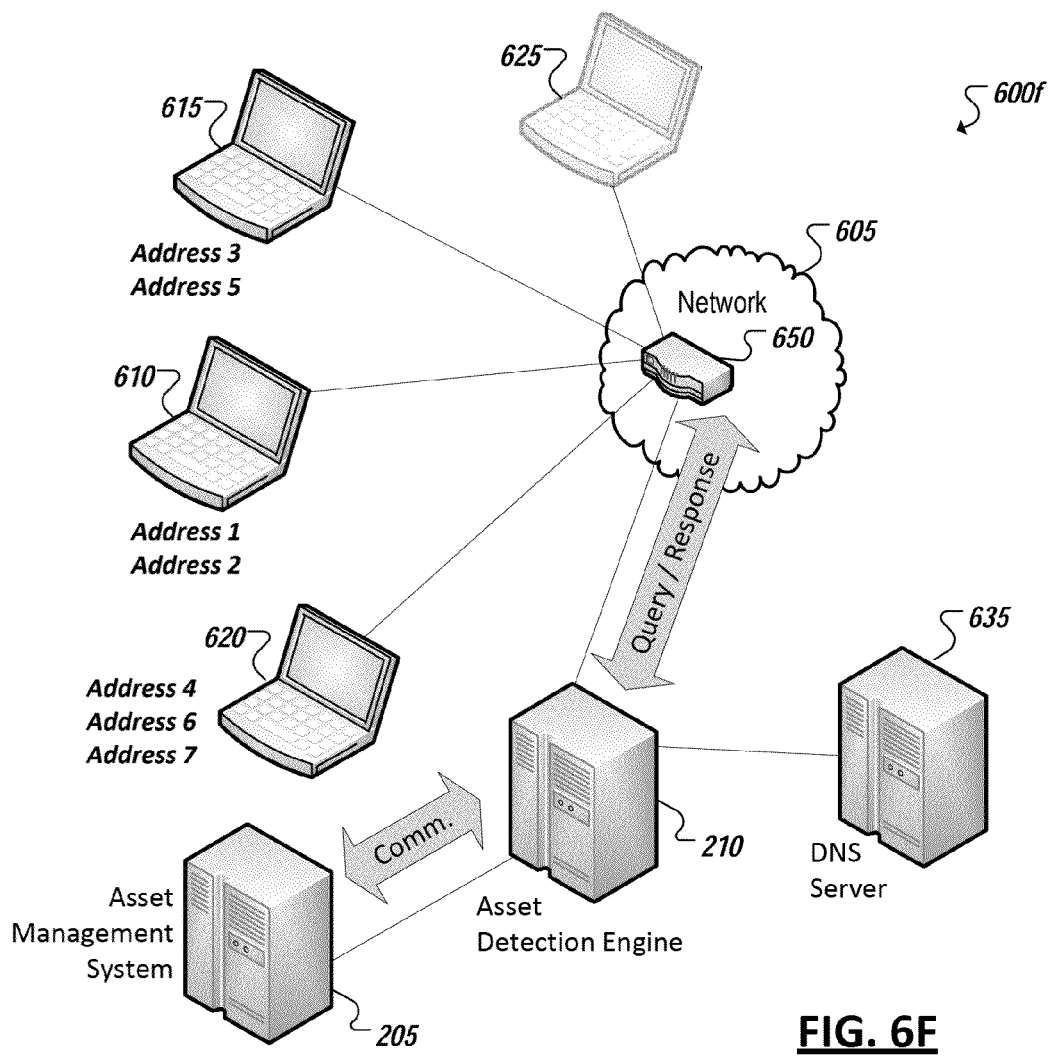

Turning to FIG. 6E, additional sensors can be included on an example asset detection engine 210 adapted to perform additional discovery tasks, including indirect-type discovery tasks. As an example, as shown in FIG. 6E, an indirect-type sensor can query records of other network elements, services, and computing devices on a network (e.g., 605) to identify previously unidentified address information of known and unknown devices on the network 605. For instance, in the example of FIG. 6E, an indirect-type sensor can be employed to query data structures, such as databases, of a network management server 645 hosting one or more network services, such as a DHCP server, intrusion detection system (IDS) system, or other server that, in the course of its operation, records address information of devices within the network 605 in the data structures managed by the network management server 645. In other examples, an indirect-type sensor can be employed to query data structures maintained by network elements 650 in the network 605, such as a MAC address table maintained by a router 650, as in FIG. 6F, or other computing devices (including network elements) within the network 605. In either instance, a query of other services or network elements in a network 605 by an indirect discovery type sensor can be used to identify still further address information (e.g., "Address 8") and corresponding devices (e.g., device 625) within the network 605.

Figure 6G:
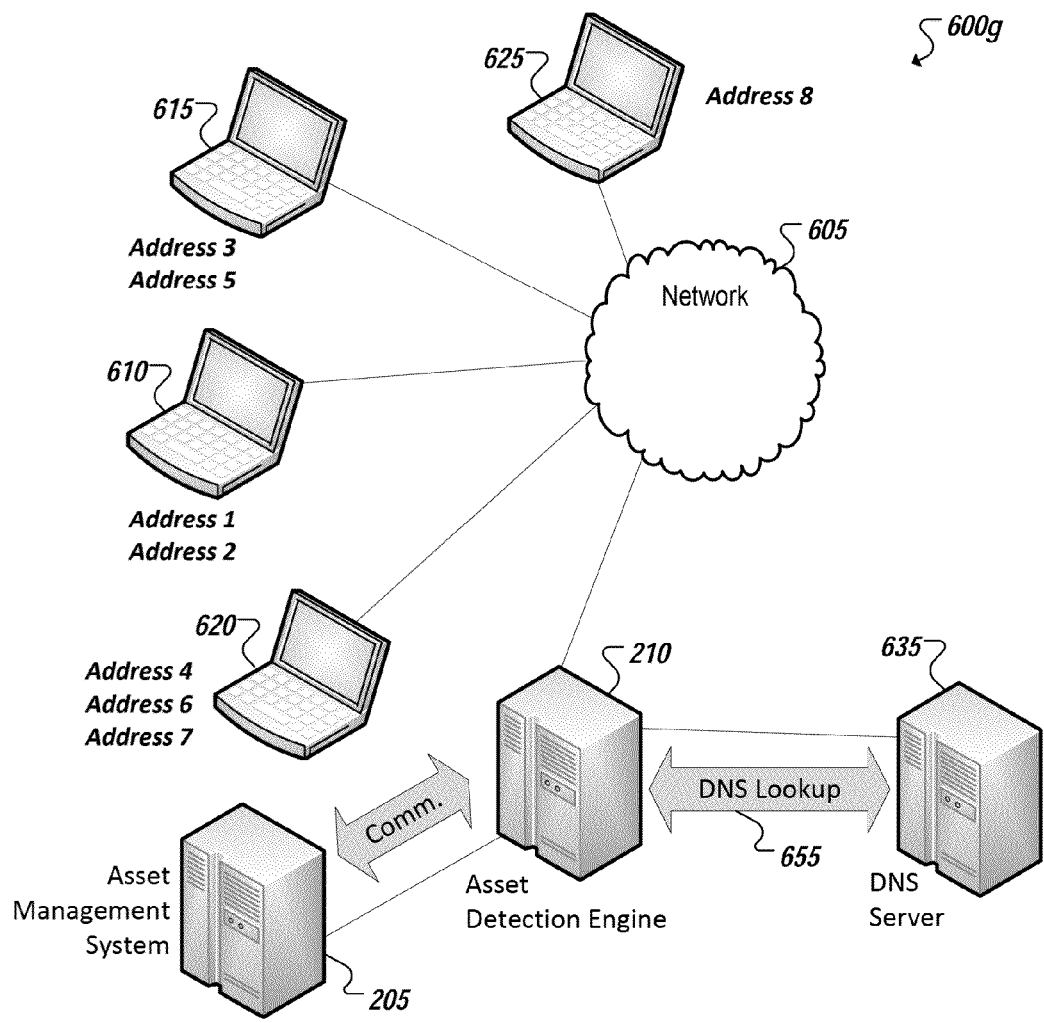

An indirect-type sensor can query a source network management server (e.g., 645) or network element (e.g., 650) to obtain the entirety or a subset of the data structures containing the address information collected by the address data source (e.g., 645, 650). For instance, in some examples, an unfiltered set of data can be returned by a sensor of the asset detection engine 210 in response to a query and processed by the asset detection engine 210 and/or asset management system 205 to identify the address information of interest to the asset management system 205 (e.g., the identification of new or different address information from that maintained in the asset repository). In other instances, an indirect discovery type sensor of an asset detection engine 210 can perform a filtered query of a source network management server 645, for instance, to return a subset of data from the network management server 645, such as the data most-recently collected by the network management server 645, data collected during a particular period of time, etc. Additionally, as in other examples, address information collected by an indirect discovery technique performed by indirect discovery type sensors of an asset detection engine 210 can be used as inputs or catalysts of other discovery tasks performed by other sensors, such as a DNS mapping (e.g., 655) or other task, that can be used to discover still further attributes and address information (e.g., "Address 9," "Address 10"), as shown in the examples of FIGS. 6G and 6H.

Figure 6H:
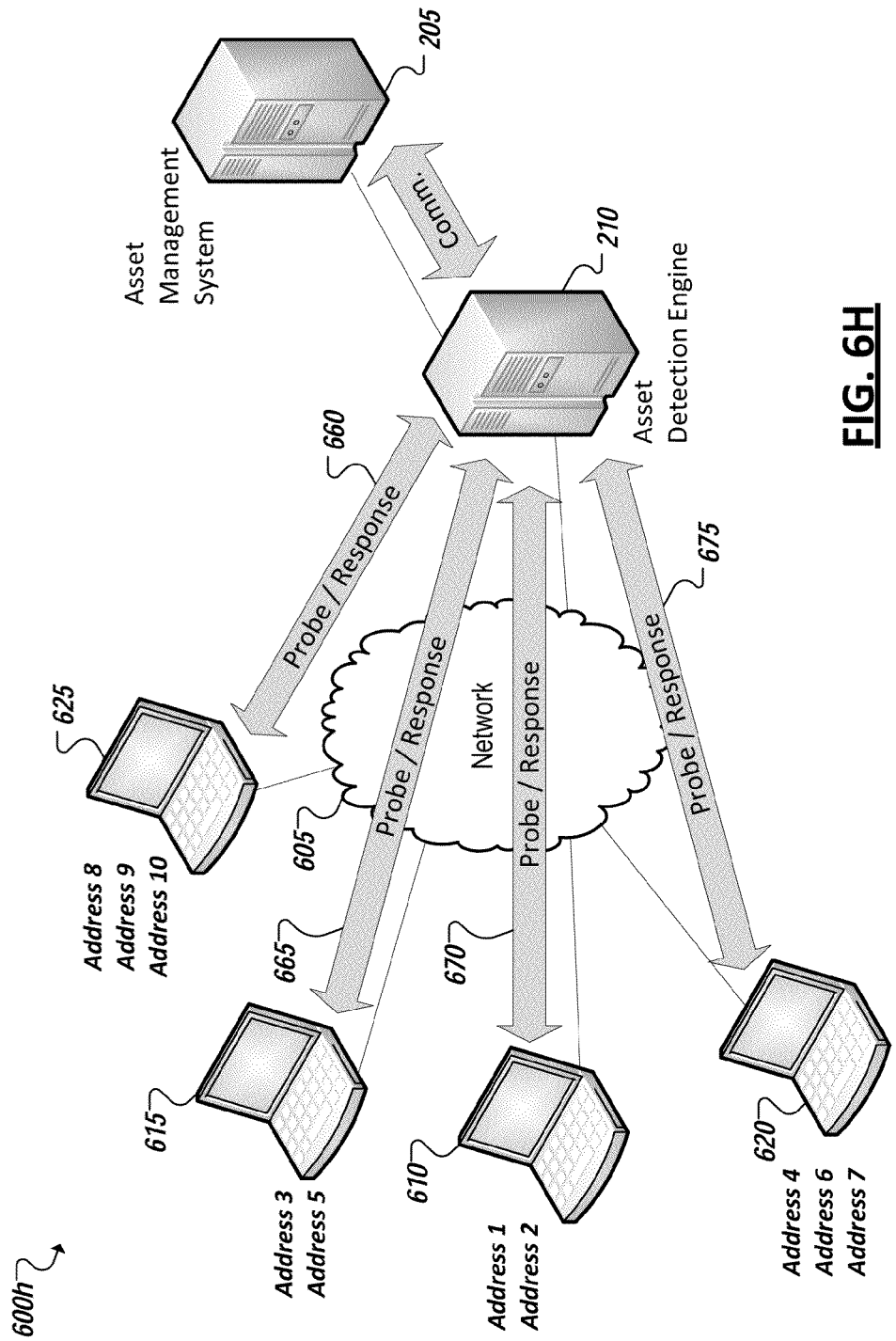

Turning to FIG. 6H, in addition to performing passive discovery and in some cases a chain or series of indirect discovery tasks (e.g., using passive sensors 285 according to one particular task sequence in a library of possible task sequences) to discover new address information and corresponding network devices (e.g., 610, 615, 620, 625), an asset detection engine 210 can utilize the information discovered by previous passive discovery tasks to engage active discovery sensors (e.g., 280) to perform active discovery tasks on the discovered devices 610, 615, 620, 625 (e.g., in further accordance with a particular defined task sequence). In some implementations, an active discovery sensor may not be able to perform its discovery task without having a particular identification of a target device (e.g., the target device IP address). Accordingly, the discovery of one or more addresses of a particular device can be used by one or more active discovery sensors of an asset detection engine 210 to discover additional address information and attributes of the discovered devices 610, 615, 620, 625. Further, asset management system 205 can additionally identify scan engines and other tools that can use address information of discovered devices 610, 615, 620, 625 to perform scans of the devices 610, 615, 620, 625 and identify attributes of the devices 610, 615, 620, 625 including the type, hardware, peripherals, operating system, vulnerabilities, software installation, etc. of the devices 610, 615, 620, 625, among other examples.

As an example, in FIG. 6H, one or more active discovery sensors of asset detection engine 210 can use discovered address information (e.g., "Addresses 1-10") to perform additional discovery tasks (e.g., 660, 665, 670, 675) and obtain additional address information and/or attributes of the corresponding devices 610, 615, 620, 625, as well as other devices or entities (e.g., persons and applications) on the network 605. Active discovery sensors can identify devices 610, 615, 620, 625 from previously-collected address information and send packets to the devices 610, 615, 620, 625 and probe the device's respective responses to the packets in order to identify such information as the ports active on the device, the operating system of the device, protocols used by the device, services offered by the device, and so on. In some instances, the direct probing of the devices 610, 615, 620, 625 by one or more active discovery sensors of an asset detection engine 210 can be carried out in parallel. Further, an asset management system can direct the asset detection engine 210 regarding the types of probing to be performed by the sensors as well as the devices to be probed. Additional device information, including address information retrieved from the probing can then be retrieved and communicated to the asset management system to further supplement and improve its asset repository, allowing persons and applications of the probed devices to be identified, devices (and other system entities) to be tagged or otherwise grouped, have security policies assigned to them, and additional security tasks performed based on the attributes discovered using one or more asset detection engine (and, in some implementations, scan engines).

Figure 7C:
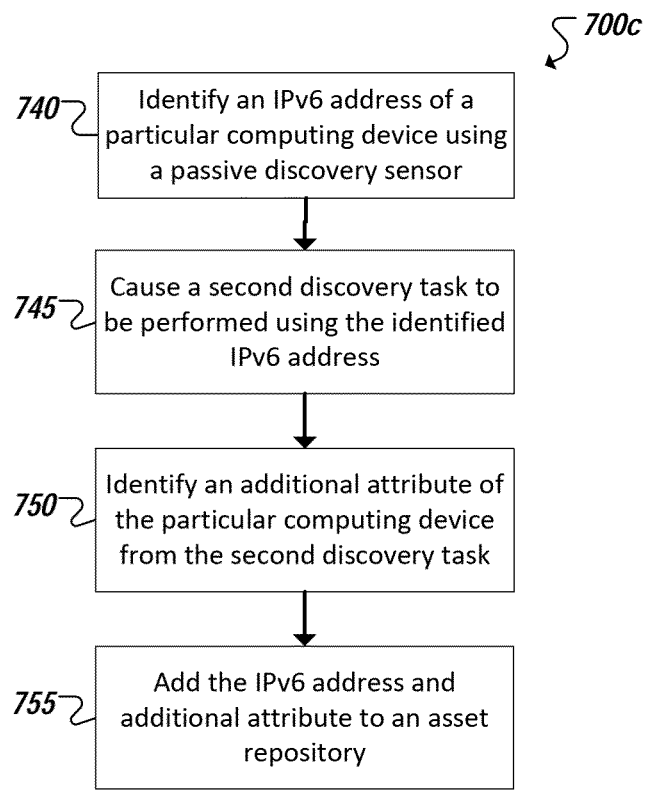

FIGS. 7A-7C are simplified flowcharts 700*a-c* illustrating example techniques utilizing discovery techniques within a computing environment. For instance, in the example of FIG. 7A, address information of a particular computing device within a network can be identified 705 using a first pluggable sensor installed on a pluggable asset detection engine employing a blade architecture. The first sensor can employ passive discovery techniques to identify the address information. The address information can include an IPv4 address, IPv6 address, MAC address, etc. of the particular computing device. A second pluggable sensor installed on the same asset detection engine can be used to identify 210 additional address information of the particular computing device. The second sensor can also employ passive discovery techniques, or can be an active discovery sensor, in either instance supplementing the address information discovered for the particular computing device using the first sensor. Additionally, the second sensor can perform discovery tasks in response to identification 705 of address information by the first sensor. For instance, a defined task sequence can be utilized that triggers actions by the second sensor when address information is discovered using the first sensor. In other instances, other actions can be taken when the first sensor is unsuccessful in discovering address information identified and collected using the pluggable sensors of the asset detection engine can be communicated 215 to an asset management system, for instance, for association with the particular computing device described in an asset repository maintained by the asset management system, for use by the asset management system in tagging the particular computing device and otherwise assigning (and enforcing) security policies to (and enforcing security policies on behalf of) the particular computing device, among other examples.

Turning to the flowchart 700*b* of FIG. 7B, a particular system entity can be identified 720 in an hierarchical asset repository defining a particular set of relationships between system entities in a computing environment. A particular tag can be assigned to a record of a particular system entity included in the asset repository. The tag can be assigned 725 by a user or can be assigned 725 automatically by an asset management system, for instance, in connection with identifying one or more attributes of the particular system entity and applying a tagging rule based on one or more of the identified attributes. Such attributes can be identified by one or both of asset detection engines and scan engines in communication with the asset management system. Tagging of the particular system entity can cause a particular security policy to be associated 730 with the particular system entity based on the assignment 725 of the tag. Indeed, the assigned particular security policy can be applied, or associated, 730 to a set of system entities that include a particular set of tags that at least includes the tag. In some instance, a security policy can be applied to system entities based on the system entity being tagged with a single particular tag or a particular combination of tags (e.g., only entities having each tag in the combination would have the security policy applied to it). In other instances, a set of tags could include alternative tags, in that any system entity assigned any one of a particular set of tags would have an associated security policy associated with the system entity and applied to the system entity.

Turning to the flowchart 700*c* of FIG. 7C, a repository of IPv6 addresses can be built to thereby assist in the identification and scanning of devices and networks employing IPv6 addressing. Such repositories can be developed for a particular computing environment, such as the computing environment of a particular enterprise or organization, or a repository could be developed attempting to capture all IPv6 addresses in use within many networks, including across the Internet. The repository can be used, for instance, to identify particular devices that can be scanned or probed for additional attributes and to discover additional system entities, such as a particular applications on the computing device, users of the computing device, etc. An IPv6 address of a particular computing device in the network can be identified 740 using a passive discovery sensor. The passive discovery sensor can be, for instance, a latent-type discovery sensor, event-based discovery sensor, or indirect-type discovery sensor and can, in some implementations, be a pluggable sensor adapted for inclusion in an expandable, blade-like architecture of an asset detection engine. A second discovery task can be caused to be performed 745 using the identified IPv6 address. The second discovery task can be performed by the same passive discovery sensor, another passive discovery sensor, such as an address-mapping sensor, or an active discovery sensor, among other examples. In some instances, the second discovery task can be caused to be performed 745 in response to the identification 740 of the IPv6 address, for instance, in connection with a defined task sequence. Additional attributes of the particular computing devices can be identified 750 from results of the second discovery task, including additional IPv6 addresses and non-address attributes. The IPv6 address and additional attribute can be added to the asset repository, in some cases representing the first address information and evidence of a particular device being present on the network.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. Systems and tools illustrated can similarly adopt alternate architectures, components, and modules to achieve similar results and functionality. For instance, in certain implementations, multitasking, parallel processing, and cloud-based solutions may be advantageous. In one alternative system or tool, the wireless authentication functionality of a simplified mobile communication device can be employed on a removable storage device, such as a portable hard drive, thumb drive, or the like. In such instances, the removable storage device can lack a user interface but possess wireless access functionality for connecting to cooperating computing devices over a short-range network, such as Bluetooth, and sharing authentication data with the cooperating computing devices over the short-range network to authenticate the holder of the wireless, portable storage device to one or more cooperating computing devices, allowing the user to both gain access to (and secure) the cooperating computing device through the wireless storage device as well as access, consume, and modify data stored on the hard drive using the authenticated-to cooperating computing device. Other systems and tools can also make use of principles of this disclosure. Additionally, diverse user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

Networks, including core and access networks, including wireless access networks, can include one or more network elements. Network elements can encompass various types of routers, switches, gateways, bridges, loadbalancers, firewalls, servers, workstations, inline service nodes, proxies, processors, modules, or any other suitable device, component, element, or object operable to exchange information in a network environment. A network element may include appropriate processors, memory elements, hardware and/or software to support (or otherwise execute) the activities associated with using a processor for screen management functionalities, as outlined herein. Moreover, the network element may include any suitable components, modules, interfaces, or objects that facilitate the operations thereof. This may be inclusive of appropriate algorithms and communication protocols that allow for the effective exchange of data or information.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, which are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. At least one non-transitory machine accessible storage medium having instructions stored thereon, the instructions when executed on a machine, cause the machine to:
   identify, using an asset detection engine, address information of a particular computing device within a network, wherein identification of the address information is facilitated by a first pluggable discovery sensor in a set of discovery sensors included in the asset detection engine, and the first pluggable discovery sensor comprises a passive-type discovery sensor;
   identify, using the asset detection engine, other address information for at least one other computing device within the network, wherein identification of the other address information is facilitated by a second pluggable discovery sensor in the set of discovery sensors, and the second pluggable discovery sensor comprises an active discovery sensor; and
   send an identification of the address information of the particular computing device to an asset management system for inclusion of the address information in an asset repository managed by the asset management system.

2. The storage medium of claim 1, wherein the instructions, when executed, further cause the machine to identify additional attributes of the particular computing device using another pluggable discovery sensor in the set of discovery sensors.

3. The storage medium of claim 2, wherein a security policy is assigned to the particular computing device based on the identified attributes identified using pluggable discovery sensors in the set of discovery sensors.

4. The storage medium of claim 3, wherein the additional attributes include at least one of active ports of the particular computing device, operating systems of the particular computing device, and applications of the particular computing device.

5. The storage medium of claim 3, wherein the particular computing device is tagged to associate the particular computing device with a particular grouping of computing devices and the security policy is associated with the particular grouping of computing devices.

6. The storage medium of claim 1, wherein each discovery sensor in the set of discovery sensors is a pluggable discovery sensor.

7. The storage medium of claim 1, wherein the asset management system determines that the identified address information was not previously included in the asset repository, and determines discovery of the particular computing device within the network based on identification of the address information.

8. The storage medium of claim 1, wherein the instructions, when executed, further cause the machine to add a pluggable discovery sensor to the set of discovery sensors.

9. The storage medium of claim 1, wherein the instructions, when executed, further cause the machine to replace one pluggable discovery sensor in the set of discovery sensors with another pluggable discovery sensor.

10. The storage medium of claim 1, wherein the passive type-discovery sensor comprises an event-based pluggable discovery sensor adapted to identify address information of computing devices on the network from event record data describing events in the network identified by event management services on the network.

11. The storage medium of claim 10, wherein the event-based pluggable discovery sensor is adapted to access event record data of at least one of dynamic host configuration protocol (DHCP) server events, Active Directory audit events, firewall events, and intrusion prevention system (IPS) events.

12. The storage medium of claim 1, wherein the passive-type pluggable discovery sensor is adapted to identify address information of computing devices on the network from network traffic monitored by the passive-type pluggable discovery sensor.

13. The storage medium of claim 12, wherein the passive-type pluggable discovery sensor is adapted to monitor at least one of NetBIOS broadcast packets in the network traffic, internet control message protocol version 6 (ICMPv6) network traffic, and network traffic via port mirroring.

14. The storage medium of claim 1, wherein the passive-type discovery sensor comprises an indirect-type pluggable discovery sensor adapted to query services of the network for data including address information of computing devices within the network.

15. The storage medium of claim 14, wherein the indirect-type pluggable discovery sensor is adapted to at least one of query a simple network management protocol (SNMP) management information base (MIB), query a DHCP database, query a router table, and issue a netstat command on another computing device in the network.

16. The storage medium of claim 1, wherein the active-type pluggable discovery sensor adapted to send data to the particular computing device and monitor responses to the sent data by the particular computing device.

17. The storage medium of claim 16, wherein the data sent by the active-type pluggable discovery sensor includes at least one of a set of internet control message protocol (ICMP) packets, a set of transmission control protocol (TCP) packets, and a set of user datagram protocol (UDP) packets.

18. The storage medium of claim 16, wherein the set of discovery sensors includes the active-type pluggable discovery sensor, the passive-type pluggable discovery sensor, wherein the passive-type discovery sensor is one of a latent-type discovery sensor, event-based discovery sensor, and indirect-type discovery sensor.

19. A method comprising:
identifying, using an asset detection engine, address information of a particular computing device within a network, wherein identification of the address information is facilitated by a first pluggable discovery sensor in a set of discovery sensors included in the asset detection engine, and the first pluggable discovery sensor is to comprise a passive-type discovery sensor;
identifying, using the asset detection engine, other address information for at least one other computing device within the network, wherein identification of the other address information is facilitated by a second pluggable discovery sensor in the set of discovery sensors, and the second pluggable discovery sensor is to comprise an active discovery sensor; and
sending an identification of the address information of the particular computing device to an asset management system for inclusion of the address information in an asset repository managed by the asset management system.

20. A system comprising:
at least one processor device;
at least one memory element; and
a pluggable asset detection engine including a set of pluggable discovery sensors, adapted when executed by the at least one processor device to:
identify particular address information of a particular computing device within a network, using a first pluggable discovery sensor in the set of discovery sensors, wherein the first pluggable discovery sensor comprises a passive-type discovery sensor;
identify other address information for at least one other computing device within the network, using a second pluggable discovery sensor in the set of discovery sensors, wherein the second pluggable discovery sensor is to comprise an active discovery sensor; and
send an identification of the particular address information of the particular computing device to an asset management system for inclusion of the particular address information in an asset repository managed by the asset management system.

21. The system of claim 20, further comprising the asset management system, the asset management system adapted when executed by the at least one processor device to:
receive the particular address information from the asset detection engine;
determine whether the address information is associated with devices described in the asset repository; and
supplement the asset repository with address information not included in the asset repository.

22. The system of claim 20, wherein the asset detection engine is a first asset detection engine in a plurality of asset detection engines in the system.

23. The system of claim 22, wherein the plurality of asset detection engines includes a second asset detection engine, the set of discovery sensors of the first asset detection engine is a first set, the second asset detection engine includes a second set of discovery sensors, and the first set of discovery sensors is different from the second set of discovery sensors.

24. The system of claim 23, wherein the first set of discovery sensors includes a particular discovery sensor also included in the second set of discovery sensors.

* * * * *

UNITED STATES PATENT AND TRADEMARK OFFICE
CERTIFICATE OF CORRECTION

| | | |
|---|---|---|
| PATENT NO. | : 9,049,207 B2 | Page 1 of 1 |
| APPLICATION NO. | : 13/444143 | |
| DATED | : June 2, 2015 | |
| INVENTOR(S) | : James Michael Hugard, IV et al. | |

It is certified that error appears in the above-identified patent and that said Letters Patent is hereby corrected as shown below:

Claims

In column 32, line 29-30, in claim 10, delete "passive type-discovery" and insert -- passive-type discovery --, therefor.

In column 32, line 63, in claim 16, after "sensor" insert -- is --.

Signed and Sealed this
Twelfth Day of April, 2016

Michelle K. Lee
*Director of the United States Patent and Trademark Office*